(12) United States Patent
Tanaka et al.

(10) Patent No.: US 12,027,672 B2
(45) Date of Patent: Jul. 2, 2024

(54) BATTERY AND BATTERY PACK

(71) Applicant: KABUSHIKI KAISHA TOSHIBA, Tokyo (JP)

(72) Inventors: Masanori Tanaka, Yokohama (JP); Tatsuya Shinoda, Yokohama (JP); Yasuaki Murashi, Yokohama (JP); Makoto Kobayashi, Kashiwazaki (JP); Koichi Takeshita, Yokohama (JP); Masahiro Murata, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 556 days.

(21) Appl. No.: 17/176,270

(22) Filed: Feb. 16, 2021

(65) Prior Publication Data
US 2021/0184267 A1    Jun. 17, 2021

Related U.S. Application Data

(63) Continuation of application No. PCT/JP2018/035142, filed on Sep. 21, 2018.

(51) Int. Cl.
*H01M 10/0587* (2010.01)
*H01M 4/02* (2006.01)
(Continued)

(52) U.S. Cl.
CPC ....... *H01M 10/0587* (2013.01); *H01M 4/485* (2013.01); *H01M 10/0525* (2013.01);
(Continued)

(58) Field of Classification Search
CPC ......... H01M 10/0587; H01M 10/0525; H01M 50/184; H01M 50/103; H01M 50/463; H01M 4/485; H01M 2004/021
See application file for complete search history.

(56) References Cited

U.S. PATENT DOCUMENTS

2008/0241687 A1* 10/2008 Ishii ..................... B60L 50/20
429/246
2008/0280193 A1    11/2008 Takagi et al.
(Continued)

FOREIGN PATENT DOCUMENTS

CN    101276942 A    10/2008
CN    105493334 A    4/2016
(Continued)

OTHER PUBLICATIONS

International Search Report dated Dec. 4, 2018 in PCT/JP2018/035142 filed on Sep. 21, 2018, 2 pages.
(Continued)

*Primary Examiner* — Christopher P Domone
*Assistant Examiner* — Jonathan William Estes
(74) *Attorney, Agent, or Firm* — Maier & Maier, PLLC

(57) ABSTRACT

According to one embodiment, a battery includes an external container, an electrode group, and a sealing plate. The electrode group includes a positive electrode and a negative electrode wound in a flat shape with an insulating layer interposed therebetween. Thicknesses $T_E$ of the positive and negative electrodes are each from 0.03 mm to 0.08 mm. A first direction is orthogonal to a winding axis direction of the electrode group. A second direction is parallel to the winding axis direction. The thicknesses $T_E$ of each electrode, a thickness $T_W$ of the electrode group in the third direction orthogonal to the first and second directions, and an innermost circumferential height $H_{IC}$ of the electrode group in the first direction satisfy $0.02 \leq (T_E \times T_W)/H_{IC} \leq 0.04$.

14 Claims, 6 Drawing Sheets

(51) Int. Cl.
  *H01M 4/485* (2010.01)
  *H01M 10/0525* (2010.01)
  *H01M 50/103* (2021.01)
  *H01M 50/184* (2021.01)
  *H01M 50/463* (2021.01)

(52) U.S. Cl.
  CPC ....... *H01M 50/103* (2021.01); *H01M 50/184* (2021.01); *H01M 50/463* (2021.01); *H01M 2004/021* (2013.01)

(56) References Cited

U.S. PATENT DOCUMENTS

| | | |
|---|---|---|
| 2009/0169993 A1 | 7/2009 | Ohashi et al. |
| 2014/0272552 A1 | 9/2014 | Tanaka et al. |
| 2015/0325832 A1 | 11/2015 | Saito et al. |
| 2016/0049685 A1 | 2/2016 | Sasaki et al. |
| 2016/0197350 A1 | 7/2016 | Nishide et al. |
| 2016/0293929 A1 | 10/2016 | Kitaoka et al. |
| 2016/0344064 A1 | 11/2016 | Tanaka et al. |
| 2018/0062147 A1* | 3/2018 | Onoda ................ H01M 50/264 |

FOREIGN PATENT DOCUMENTS

| | | |
|---|---|---|
| CN | 106063021 A | 10/2016 |
| JP | 2004-095357 A | 3/2004 |
| JP | 2007103295 A | 4/2007 |
| JP | 2007-157560 A | 6/2007 |
| JP | 2009-158376 A | 7/2009 |
| JP | 2012-182025 A | 9/2012 |
| JP | 5261869 B2 | 8/2013 |
| JP | 2014-179248 A | 9/2014 |
| JP | 5696886 B2 | 4/2015 |
| JP | 2015138621 A | 7/2015 |
| JP | 2016-042433 A | 3/2016 |
| JP | 2016-105415 A | 6/2016 |
| JP | 2016-189247 A | 11/2016 |
| JP | JP WO2014/118873 A1 | 1/2017 |
| JP | 2017-126400 A | 7/2017 |
| WO | WO 2014/118873 A1 | 8/2014 |

OTHER PUBLICATIONS

Extended European Search Report dated Aug. 31, 2021 in European Patent Application No. 18933938.5, 7 pages.
Office Action issued on Apr. 11, 2024, in corresponding Chinese Application No. 201880094043.7, 14 pages.

* cited by examiner

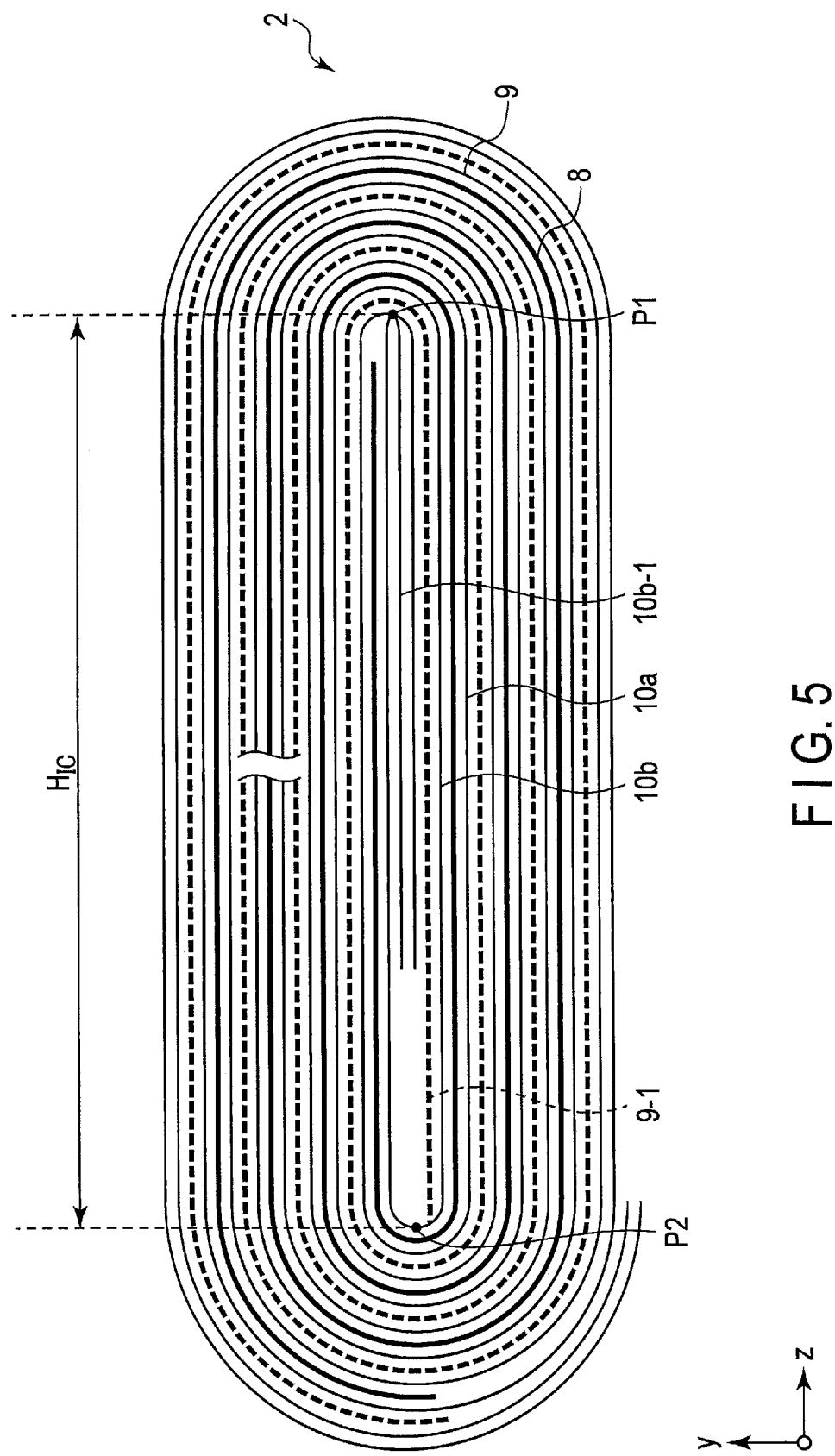
F I G. 5

BATTERY AND BATTERY PACK

This application is a Continuation Application of PCT Application No. PCT/JP2018/035142, filed Sep. 21, 2018, the entire contents of which are incorporated herein by reference.

FIELD

Embodiments described herein relate generally to a battery and a battery pack.

BACKGROUND

Recently, the prevalence of electric vehicles such as hybrid electric vehicles and plug-in electric vehicles has rapidly increased. For power sources of these electric vehicles, lithium ion secondary batteries have been mainly used as nonaqueous electrolyte batteries capable of charge and discharge.

The lithium ion secondary battery is produced by, for example, the following method. First, a positive electrode and a negative electrode are prepared. The positive electrode and the negative electrode can be formed by applying slurries containing a positive electrode active material and a negative electrode active material that are capable of absorbing and releasing lithium ions, onto their respective current collectors, and drying their respective coating films to provide a positive electrode active material-containing layer and a negative electrode active material-containing layer. Such positive and negative electrodes are wound with a separator interposed therebetween, thereby producing a flat-shaped electrode group. Next, the electrode group is housed in a container made of metal such as aluminum or an aluminum alloy, and a sealing plate is welded onto an opening portion of the container. Then, a nonaqueous electrolyte is put into the container from an inlet provided on the sealing plate. Subsequently, a seal member is welded to the inlet to obtain a battery unit. Then, the battery unit is subjected to an initial charging and/or an aging treatment, whereby the lithium ion secondary battery can be obtained.

The nonaqueous electrolyte batteries such as the lithium ion secondary battery thus obtained have been demanded to have a high input/output performance.

BRIEF DESCRIPTION OF THE DRAWINGS

FIG. 5 is a cross-sectional view of the electrode shown in FIG. 4 cut along a V-V line;

DETAILED DESCRIPTION

Figure 1:
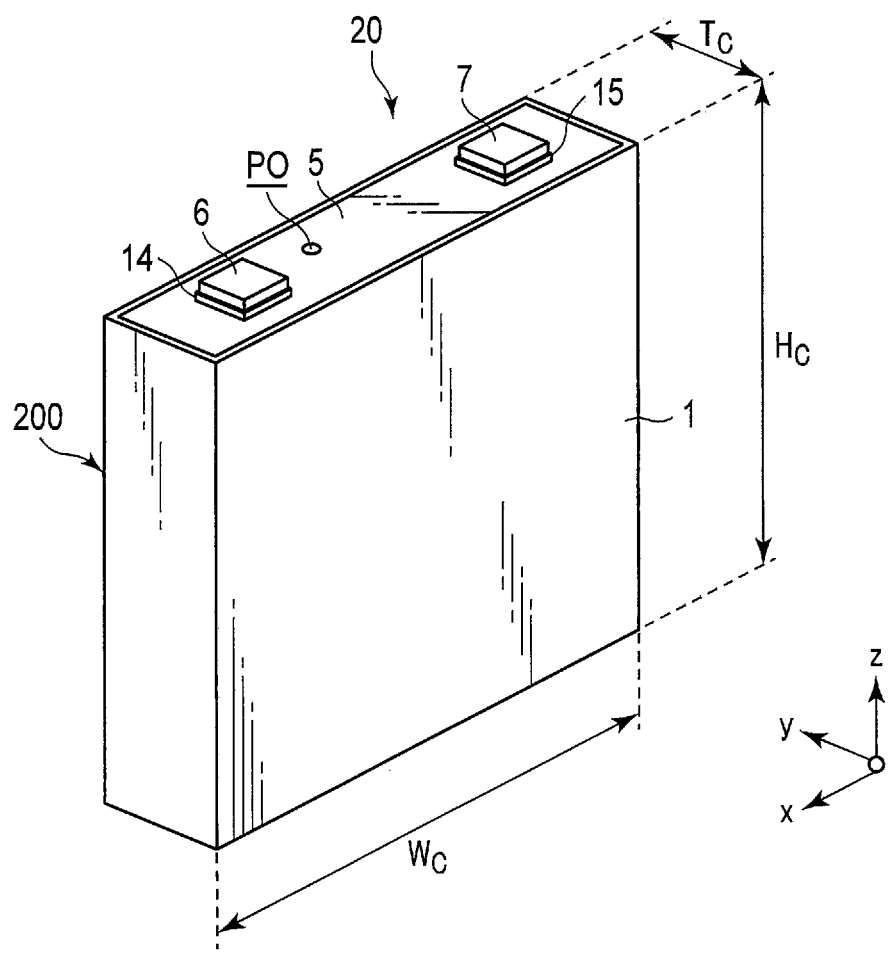
FIG. 1 is a perspective view schematically showing an example of a battery according to an embodiment.

According to one embodiment, a battery is provided. The battery includes an external container, an electrode group, and a sealing plate. The external container includes a bottom wall and a lateral wall. The lateral wall extends from the bottom wall in a first direction. The external container is provided with an opening portion opposing the bottom wall. The electrode group includes a positive electrode, a negative electrode, and an insulating layer. The positive electrode and the negative electrode are wound in a flat shape with the insulating layer interposed therebetween. The electrode group is housed in the external container such that a winding axis direction is orthogonal to the first direction. The sealing plate is attached to the opening portion of the external container. A thickness of the positive electrode and a thickness of the negative electrode are equal to or different from each other. A thickness $T_E$ of each electrode is from 0.03 mm to 0.08 mm. A second direction is a direction parallel to the winding axis direction. A third direction is a direction orthogonal to the first direction and the second direction. The thickness $T_E$ (mm) of the electrode, a thickness $T_W$ (mm) of the electrode group in a direction parallel to the third direction, and an innermost circumferential height $H_{IC}$ (mm) of the electrode group in a direction parallel to the first direction satisfy following formula (1):

$$0.02 \leq (T_E \times T_W)/H_{IC} \leq 0.04 \tag{1}$$

According to another embodiment, a battery pack is provided. The battery pack includes the battery according to an embodiment.

First Embodiment

An excellent output performance may be required for a nonaqueous electrolyte battery. As one way to enhance the output performance of the nonaqueous electrolyte battery, it is considered effective to reduce the thickness of an active material-containing layer. That is, when the thickness of the active material-containing layer is small, the distance for lithium ions to move between a positive electrode and a negative electrode is shortened, and the facing areas of the positive electrode and the negative electrode can be increased, as well. This can reduce the internal resistance in the electrodes, and it is considered that the output performance of the nonaqueous electrolyte battery is thereby enhanced.

However, after having intensively studied on the basis of such findings, the present inventors have found that when the thickness of the active material-containing layer is reduced, although the output performance of the nonaqueous electrolyte battery is enhanced, there arises the problem of a significant drop in life performance.

After having further studied the cause of the problem, the present inventors have found that the drop in life performance results from generation of crimples in the electrode inside exterior parts. That is, in an electrode of the nonaqueous electrolyte battery, a nonaqueous solvent and an electrolytic salt contained in the nonaqueous electrolyte may be partly decomposed through an aging treatment and/or charge and discharge, which may generate gas. The gas is usually released through a porous body such as an active material-containing layer and a separator to the outside of an electrode group, and may accumulate in a gap between the electrode group and the exterior parts. At this time, the gas generated at the electrode may widen the gap between the electrode and its counter electrode.

Here, when the thickness of an electrode is small, the rigidity of the electrode tends to be low, and thus the release of the gas is more likely to widen the gap between the electrode and its counter electrode. As a result, large crimples may occur in the electrodes. If such large crimples occur in the electrodes or if a localized large gap is present between the electrodes, no reaction between the electrodes would occur at those places, whereby a nominal capacity decreases. Further, the reaction between the electrodes may be concentrated at some portions. This accelerates the deterioration of the electrodes or the decomposition of the nonaqueous electrolyte, resulting in the drop in the life performance of the battery. In addition, the internal resistance may increase and the nominal capacity of the battery may decrease, as well.

A battery according to the embodiment includes an external container, an electrode group, and a sealing plate. The external container includes a bottom wall and a lateral wall. The lateral wall extends from the bottom wall in a first direction. The external container is provided with an opening portion opposing the bottom wall. The electrode group includes a positive electrode, a negative electrode, and an insulating layer. The positive electrode and the negative electrode are wound in a flat shape, having the insulating layer interposed therebetween. The electrode group is housed in the external container in such a manner that a winding axis direction is orthogonal to the first direction. The sealing plate is attached to the opening portion of the external container. A thickness of the positive electrode and a thickness of the negative electrode may be equal to one another or maybe different from one another. A thickness $T_E$ of each of the electrodes is from 0.03 mm to 0.08 mm. A second direction is a direction parallel to the winding axis direction. A third direction is a direction orthogonal to the first direction and the second direction. The thickness $T_E$ (mm) of the electrode, a thickness $T_W$ (mm) of the electrode group in a direction parallel to the third direction, and an innermost circumferential height $H_{IC}$ (mm) of the electrode group in a direction parallel to the first direction satisfy the following formula (1):

$$0.02 \leq (T_E \times T_W)/H_{IC} \leq 0.04 \quad (1).$$

The battery according to the embodiment includes the electrodes having a relatively small thickness of 0.08 mm or less. In the battery according to the embodiment, by adjusting the thickness $T_W$ of the electrode group and the innermost circumferential height $H_{IC}$ of the electrode group to satisfy the above formula (1), even though electrodes with a relatively small thickness are included, the electrodes can be made less likely to crimple. Thus, the battery according to the embodiment can achieve an excellent life performance. In addition, the battery according to the embodiment can attain both excellent life performance and excellent input/output performance.

Hereinafter, the battery according to the embodiment will be described in detail with reference to the drawings.

FIG. 1 is a perspective view schematically showing an example of the battery according to the embodiment.

A battery 20 shown in FIG. 1 includes exterior parts 200, an electrode group and an electrolyte (not illustrated), a positive electrode terminal 6, a negative electrode terminal 7, and insulating gaskets 14 and 15. The battery 20 shown in FIG. 1 is a prismatic battery in which the electrode group and the electrolyte (not illustrated) are housed in the exterior parts 200. The exterior parts 200 includes an external container 1 having an opening portion, and a sealing plate 5 attached to the opening portion of the external container 1. The sealing plate 5 is provided with an inlet PO. The inlet PO is welded with a seal member (not illustrated).

The exterior part 200 has a prismatic shape, as shown in FIG. 1. When the exterior part 200 has the prismatic shape, the volumetric energy density of the battery 20 can be increased.

The external container 1 has a shape of a prismatic can which includes a bottom wall, a pair of long-side lateral walls, and a pair of short-side lateral walls, and which is provided with an opening portion opposite the bottom wall. The bottom wall is in a rectangular shape having a pair of long sides parallel to the X-axis direction and a pair of short sides parallel to the Y-axis direction. The pair of long-side lateral walls extend from the pair of long sides of the bottom wall in the Z-axis direction. The pair of short-side lateral walls extend from the pair of short sides of the bottom wall in the Z-axis direction. Note that the X-axis direction and the Y-axis direction are directions which are parallel to the bottom wall and which intersect with each other. Also note that the Z-axis direction is a direction orthogonal to the X-axis direction and the Y-axis direction.

Here, the X-axis direction is a direction parallel to the winding axis of the electrode group (not illustrated) as well as a direction parallel to the second direction. The Y-axis direction is a direction parallel to the third direction. The Z-axis direction is a direction parallel to the first direction.

The external container 1 is formed of, for example, a metal plate. Examples of the metal include aluminum, an aluminum alloy, iron, and stainless steel.

Preferably, thicknesses of the plates forming the long-side lateral walls of the external container 1 are smaller than a thickness of the plate forming the bottom wall of the external container 1 and smaller than thicknesses of the plates forming the short-side lateral walls of the external container 1. Namely, the long-side lateral walls of the external container 1 are portions occupying the largest area among the rectangle-shaped exterior parts 200. Therefore, when the thicknesses of the plates forming the long-side lateral walls of the external container 1 are small, the battery 20 can have an enhanced heat dissipation, and thus can have an enhanced life performance. The thicknesses of the plates forming the long-side lateral walls of the external container 1 are preferably 2.0 mm or less, more preferably 1.0 mm or less, and even more preferably 0.7 mm or less.

On the other hand, if the thicknesses of the plates forming the long-side lateral walls of the external container 1 are excessively small, the rigidity of the external container 1 would be lowered, and the battery performance may deteriorate due to the weakness in maintaining the shape of the electrode group when gas is generated within the external container 1. The thicknesses of the plates forming the long-side lateral walls of the external container 1 are preferably 0.3 mm or more, and more preferably 0.5 mm or more.

Note that the thicknesses of the plates of the bottom wall, the long-side lateral walls, and the short-side lateral walls of the external container 1 are obtained by measuring thicknesses of the centers of their respective plates with a micrometer. Namely, the thickness of the bottom wall plate of the external container 1 is obtained by a method described below. First, the plate forming the bottom wall is cut in parallel with the YZ plane at the middle along the X-axis direction. Next, the thickness of the plate is measured at the middle along the Y-axis direction in the cross-section, and defined as a thickness of the bottom wall plate of the external container 1. The thicknesses of the plates forming the long-side lateral walls of the external container 1 are obtained by a method described below. First, the plates forming the long-side lateral walls are cut in parallel with the XY plane at the middle along the Z-axis direction. Next, the thicknesses of the plates are measured at the middle along the X-axis direction in the cross-section and defined as thicknesses of the long-side lateral wall plates of the external container 1. The thicknesses of the plates forming the short-side lateral walls of the external container 1 are obtained by a method described below. First, the plates forming the short-side lateral walls are cut in parallel with the XY plane at the middle along the Z-axis direction. Next, the thicknesses of the plates are measured at the middle along the Y-axis direction in the section and defined as thicknesses of the short-side lateral wall plates of the external container 1. Note that as the micrometer, for example, Quick Mini PK-1012CPX manufactured by Mitutoyo Corporation or a device having a function equivalent thereto is used.

The sealing plate 5 is positioned parallel to the bottom wall of the external container 1. The sealing plate 5 is made of the same material as the material of the external container 1. The sealing plate 5 may be made of a material different from that of the external container 1. The sealing plate 5 is, for example, attached to the opening portion of the external container 1 by welding. On the main surface of the sealing plate 5 inside the container, an insulating sheet (not illustrated) is provided. The sealing plate 5 may be provided with a degassing port or a gas discharge valve for discharging gas generated inside the exterior parts 200 to the outside.

The positive electrode terminal 6 and the negative electrode terminal 7 are attached to the sealing plate 5 respectively via the insulating gaskets 14 and 15. The positive electrode terminal 6 and the negative electrode terminal 7 may be fixed to the sealing plate 5 by caulking. The protrusions (not illustrated) at the lower ends of the positive electrode terminal 6 and the negative electrode terminal 7 penetrate the sealing plate 5 and extend toward the inside of the external container 1. The positive electrode terminals 6 and 7 are made of, for example, a metal such as aluminum, aluminum alloy, copper, or nickel.

The insulating gaskets 14 and 15 are made of, for example, an insulating material. The insulating material is, for example, a resin. Note that the insulating gaskets 14 and 15 may be omitted.

Preferably, a width $W_C$ of the exterior part 200 in a direction parallel to the second direction is selected appropriately according to the size of the electrode group to be housed therein. The lower limit of the width We of the exterior part 200 is 70 mm or more according to one example, and 80 mm or more according to another example. The upper limit of the width We of the exterior part 200 is 160 mm or less according to one example, and 150 mm or less according to another example.

The width $W_C$ of the exterior part 200 is obtained by measuring the length from one short-side lateral wall to the other short-side lateral wall of the exterior part 200 in the X-axis direction at a position in the middle along the Y-axis direction and the Z-axis direction. For the measurement, for example, a micrometer such as Quick Mini PK-1012CPX manufactured by Mitutoyo Corporation, or a device having a function equivalent thereto is used.

Preferably, a thickness $T_C$ of the exterior part 200 in a direction parallel to the third direction is selected appropriately according to the size of the electrode group to be housed therein. The lower limit of the thickness $T_C$ of the exterior part 200 is 10 mm or more according to one example, and 14 mm or more according to another example. The upper limit of the thickness $T_C$ of the exterior part 200 is 25 mm or less according to one example, and 24 mm or less according to another example. When the thickness $T_C$ of the exterior part 200 is large, the sizes of the positive electrode terminal 6 and the negative electrode terminal 7 to be fixed to the sealing plate 5 or the size of the gas discharge valve can be increased, and thus the safety of the battery 20 can be enhanced.

The thickness $T_C$ of the exterior part 200 is obtained by measuring the length from one long-side lateral wall to the other long-side lateral wall of the exterior part 200 in the Y-axis direction at a position in the middle along the X-axis direction and the Z-axis direction. For the measurement, for example, a micrometer such as Quick Mini PK-1012CPX manufactured by Mitutoyo Corporation, or a device having a function equivalent thereto is used.

Preferably, a height $H_C$ of the exterior part 200 in a direction parallel to the first direction is selected appropriately according to the size of the electrode group to be housed therein. The lower limit of the height $H_C$ of the exterior part 200 is 40 mm or more according to one example, and 45 mm or more according to another example. The upper limit of the height $H_C$ of the exterior part 200 is 85 mm or less according to one example, and 80 mm or less according to another example. When the height $H_C$ of the exterior part 200 is small, the area of the long-side lateral wall of the exterior parts 200 can be reduced, and thus the rigidity of the battery 20 can be increased.

The height $H_C$ of the exterior part 200 is obtained by measuring the length from the bottom wall to the sealing plate 5 of the exterior parts 200 in the Z-axis direction at position in the middle along the X-axis direction and the Y-axis direction. For the measurement, for example, a micrometer such as Quick Mini PK-1012CPX manufactured by Mitutoyo Corporation, or a device having a function equivalent thereto is used.

Here, the exterior parts 200 may be swollen and deformed by gas generated inside the exterior parts 200 through charge and discharge and/or an aging treatment of the battery 20. In particular, long-side lateral wall portions are apt to be expanded by the internal gas, and the thickness $T_C$ of the exterior part 200 is thus more likely to be affected by the expansion. Therefore, the measurements of the width $W_C$, the thickness $T_C$, and the height $H_C$ of the exterior part 200 is performed after a degassing treatment for releasing the gas inside the exterior parts 200 to the outside.

The thickness $T_C$ and the height $H_C$ of the exterior part preferably satisfy the following formula (7):

$$2.5 \leq H_C/T_C \leq 3.5 \tag{7}$$

Such a battery 20 can be considered as having a smaller height $H_C$ and a larger thickness $T_C$ as compared with a battery using conventional exterior parts. Such a battery 20 has long-side lateral walls with smaller areas as compared with a conventional battery, and thus is less likely to expand and deform even when gas is generated inside the exterior parts 200. Such a battery 20 tends to have a high life performance.

The width $W_C$ and the thickness $T_C$ of the exterior part 200 preferably satisfy the following formula (8):

$$4.5 \leq W_C/T_C \leq 6.5 \tag{8}$$

Such a battery 20 can be considered as having a larger thickness $T_C$ as compared with a battery using conventional exterior parts. There is tendency in such a battery 20, where the electrode group less likely to deteriorate and life performance is higher, as compared with the conventional battery.

A ratio $W_C/H_C$ between the width $W_C$ and the height $H_C$ of the exterior part 200 is preferably from 1.3 to 22. When such exterior parts 200 are used, the life performance of the battery 20 tends to be enhanced. That is, conventional prismatic exterior parts have a ratio $W_C/H_C$ lower than 1.3. Such exterior parts have long-side lateral walls with large areas, and thus is excellent in heat dissipation. However, as described above, the long-side lateral walls are apt to expand when gas is generated, and the expansion between the electrodes of the electrode group housed therein is also likely to occur, which makes the electrodes likely to become crimpled.

Here, the exterior parts having a prismatic shape has been described as an example, but the shape of the exterior parts is not limited to a prismatic shape. That is, the bottom wall of the external container 1 may be in a circular shape, an elliptical shape, or a polygonal shape. Further, the shape of the exterior container 1 may be cylindrical or indefinite.

Figure 2:
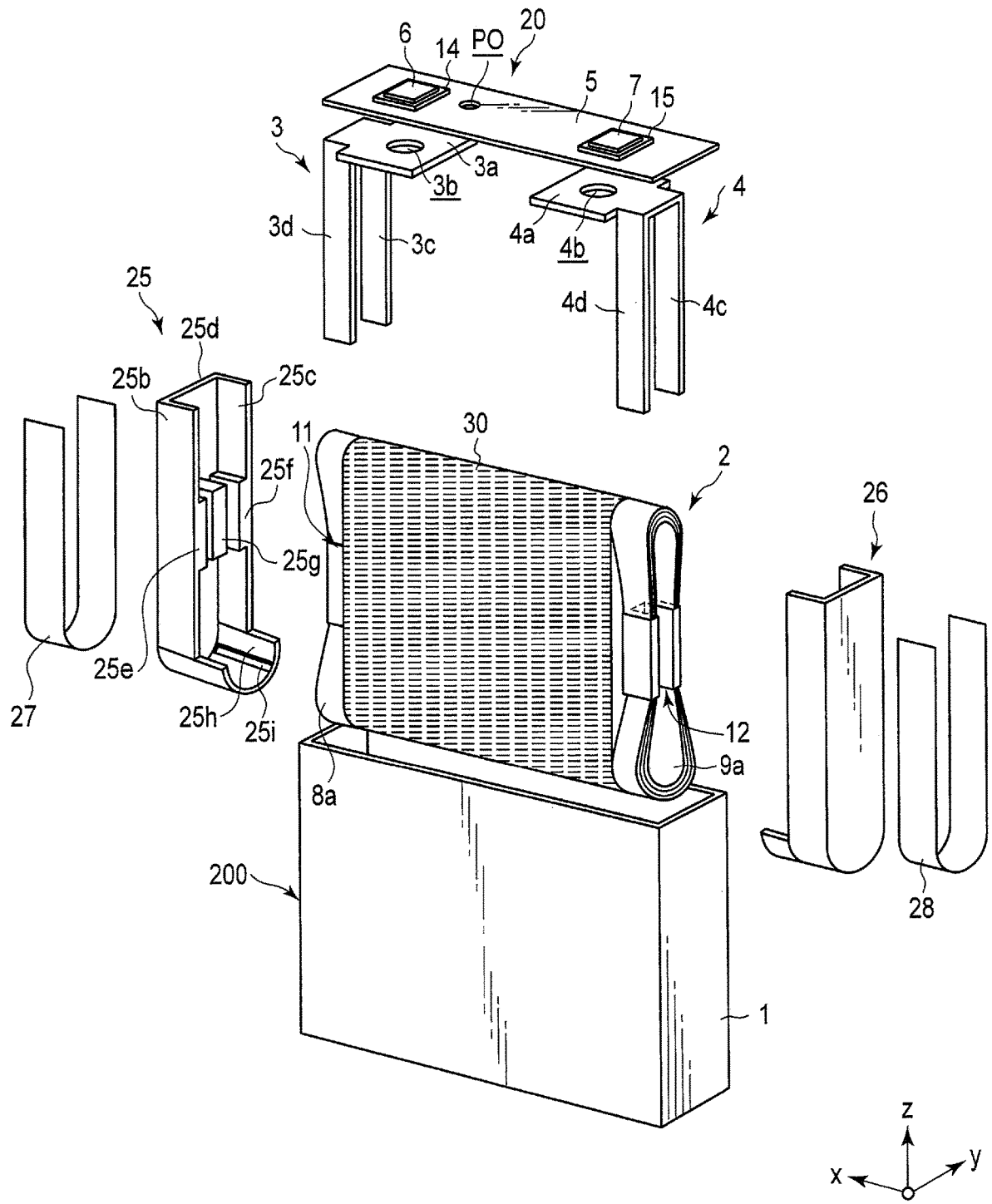
FIG. 2 is an exploded perspective view of the battery shown in FIG. 1.

FIG. 2 is an exploded perspective view of the battery shown in FIG. 1. As shown in FIG. 2, the battery 20 includes the exterior parts 200 housing an electrode group 2, a positive electrode lead 3, a negative electrode lead 4, fixing members 11 and 12, a positive electrode insulating cover 25, a negative electrode insulating cover 26, insulating cover fixing tapes 27 and 28, an insulating tape 30, and an electrolyte (not illustrated).

The electrode group 2 includes a positive electrode, a negative electrode, and an insulating layer. The electrode group 2 is configured by winding the positive electrode and the negative electrode with the insulating layer interposed therebetween about the winding axis in a flat shape. Details of the electrode group 2 will be described later.

The fixing members 11 and 12 partially fix a positive electrode current collecting tab 8a and a negative electrode current collecting tab 9a of the electrode group 2, respectively. Each of the fixing members 11 and 12 has two sandwiching units. The two sandwiching units bundle the current collecting tabs at parts that face each other through the innermost circumferential face in the wound tab. Details of the positive electrode current collecting tab Ba and the negative electrode current collecting tab 9a will be described later. The fixing members 11 and 12 are made, for example, of a metal such as aluminum, aluminum alloy, copper, or nickel. Note that the fixing members 11 and 12 may be omitted.

The insulating tape 30 covers a portion of the electrode group 2 excluding the positive electrode current collecting tab 8a and the negative electrode current collecting tab 9a. As a substrate of the insulating tape 30, at least one resin selected from the group consisting of polyester (PET), polyimide, polyphenylene sulfide (PPS), and polypropylene may be used. Note that the insulating tape 30 may be omitted.

The positive electrode lead 3 is electrically connected to the positive electrode terminal 6 and the positive electrode current collecting tab 8a. The positive electrode lead 3 includes: a connection plate 3a for connecting to the positive electrode terminal 6; and first and second sandwiching strips 3c and 3d for connecting to the positive electrode current collecting tab 8a. The connection plate 3a comes into contact with the sealing plate 5 via an insulating sheet (not illustrated) provided on the main surface of the sealing plate 5 inside the container. The protrusion of the positive electrode terminal 6 is inserted into a through hole 3b provided on the connection plate 3a and is fixed by caulking. The first and second sandwiching strips 3c and 3d are bifurcated from the connection plate 3a and sandwich the fixing member 11 and the positive electrode current collecting tab 8a. Note that the positive electrode lead 3 may be omitted.

The negative electrode lead 4 is electrically connected to the negative electrode terminal 7 and the negative electrode current collecting tab 9a. The negative electrode lead 4 includes: a connection plate 4a for connecting to the negative electrode terminal 7; and first and second sandwiching strips 4c and 4d for connecting to the negative electrode current collecting tab 9a. The connection plate 4a comes into contact with the sealing plate 5 via an insulating sheet (not illustrated) provided on the main surface of the sealing plate 5 inside the container. The protrusion of the negative electrode terminal 7 is inserted into a through hole 4b provided on the connection plate 4a and is fixed by caulking. The first and second sandwiching strips 4c and 4d are bifurcated from the connection plate 4a and sandwich the fixing member 12 and the negative electrode current collecting tab 9a. Note that the negative electrode lead 4 may be omitted.

The positive electrode insulating cover 25 covers one side surface of the electrode group 2 in the X-axis direction so as to sandwich the first and second sandwiching strips 3c and 3d of the positive electrode lead 3, the fixing member 11, and the positive electrode current collecting tab 8a. The positive electrode insulating cover 25 includes: a first lateral wall 25b and a second lateral wall 25c facing each other; a back surface member 25d coupling the first and second lateral walls; a convex portion 25e provided on the first lateral wall; a convex portion 25f provided on the second lateral wall; a convex portion 25g provided on the back surface member 25d; and an extending portion 25h extending from lower end portions of the first lateral wall 25b, the second lateral wall 25c, and the back surface member 25d. The convex portions 25e, 25f, and 25g are fitted onto the side surface of the electrode group 2 in the X-axis direction so as to sandwich the two sandwiching units of the fixing member 11. The extending portion 25h is provided with a channel groove 25i extending in the X-axis direction. The channel groove 25i may hold the electrolyte (not illustrated). Note that the positive electrode insulating cover 25 may be omitted.

The negative electrode insulating cover 26 has the same structure as the positive electrode insulating cover 25. The negative electrode insulating cover 26 covers the other side surface of the electrode group 2 in the X-axis direction so as to sandwich the first and second sandwiching strips 4c and 4d of the negative electrode lead 4, the fixing member 12, and the positive electrode current collecting tab 9a. Note that the negative electrode insulating cover 26 may be omitted.

Insulating cover fixing tapes 27 and 28 respectively fix the positive electrode insulating cover 25 and the negative electrode insulating cover 26 to the insulating tape 30. Note that the insulating cover fixing tapes 27 and 28 may be omitted.

Figure 3:
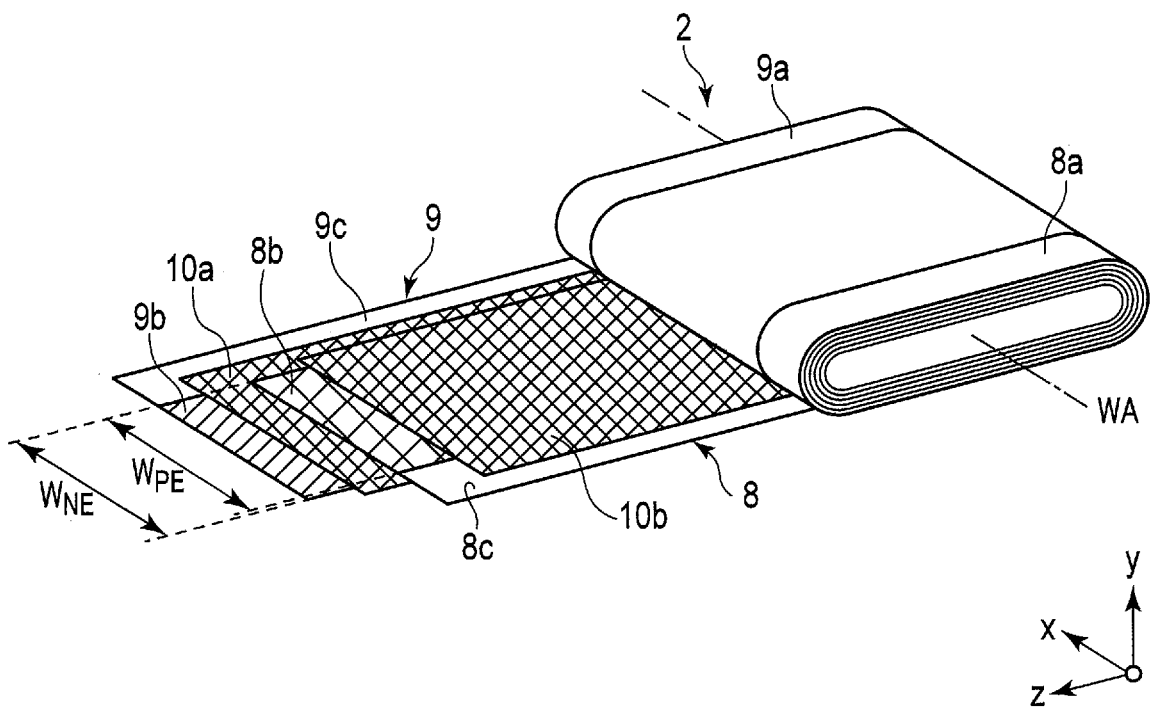
FIG. 3 is an unwound perspective view of an electrode included in the battery shown in FIG. 2.

FIG. 3 is an unwound perspective view of the electrode group included in the battery shown in FIG. 2. The electrode group 2 shown in FIG. 3 includes a positive electrode 8 and a negative electrode 9 as a pair of electrodes, and separators 10a and 10b as insulating layers. The electrode group 2 includes a sheet-shaped stack having the negative electrode 9, the separator 10a, the positive electrode 8, and the separator 10b stacked in this order. The electrode group 2 is one where the stack is wound around the winding axis WA in a flat shape such that the separator 10b is positioned at the innermost circumference. The winding axis WA is parallel to the X-axis direction.

The positive electrode 8 includes a positive electrode current collector 8c, a positive electrode active material-containing layer 8b, and the positive electrode current collecting tab 8a. The positive electrode current collector 8c has a belt shape having a pair of long sides parallel to the Z-axis direction and a pair of short sides parallel to the X-axis direction. The positive electrode active material-containing layer 8b is provided on at least one main surface of the positive electrode current collector 8c, from one long side to a position between the one long side and the other long side in the X-axis direction. The length from the one long side to the position between the one long side and the other long side is defined as a width $W_{PE}$ of the positive electrode active material-containing layer 8b in a direction parallel to the second direction. That is, the width $W_{PE}$ can be referred to as a length of a short side of the positive electrode active material-containing layer 8b. Also, the positive electrode active material-containing layer 8b is provided on at least one main surface of the positive electrode current collector 8c, from one short side to the other short side in the Z-axis direction. The positive electrode current collecting tab 8a is a portion on the positive electrode current collector 8c that is not coated with the positive electrode active material-containing layer 8b. The positive electrode current collecting tab 8a extends along the X-axis direction in a direction different from that of the negative electrode current collecting tab 9a.

The positive electrode current collector 8c is, for example, a metal foil such as of aluminum, aluminum alloy, copper, or nickel. Note that the positive electrode current collecting tab 8a may be unintegrated with the positive electrode current collector 8c. That is, the positive electrode current collector tab 8a may be implemented by joining a metal foil to one long side of the positive electrode current collector 8c. As the metal foil, the same as that for the positive electrode current collector 8c may be used.

The positive electrode active material-containing layer 8b may be provided on either main surface or both main surfaces of the positive electrode current collector 8c. The positive electrode active material-containing layer 8b includes a positive electrode active material. The positive electrode active material-containing layer 8b may include an electro-conductive agent and a binder in addition to the positive electrode active material.

As the positive electrode active material, for example, a lithium transition metal composite oxide may be used.

Examples include $LiCoO_2$, $LiNi_{1-x}Co_xO_2$ (0<x<0.3), $LiMn_xNi_yCo_zO_2$ (0<x<0.5, 0<y<0.8, 0≤z<0.5), $LiMn_{2-x}M_xO_4$ (M is at least one element selected from the group consisting of Mg, Co, Al, and Ni, 0<x<0.2), $LiMPO_4$ (M is at least one element selected from the group consisting of Fe, Co, Ni, and Mn), and the like.

An average particle size of secondary particles of the positive electrode active material is preferably 10 μm or less, and more preferably 6 μm or less. When the average particle size of the secondary particles of the positive electrode active material is small, the internal resistance is small, and thus the heat dissipation associated with charge and discharge tends to be small. Therefore, when the average particle size of the secondary particles of the positive electrode active material is small, the battery 20 can be enhanced in life performance.

The electro-conductive agent increases electronic conductivity of the electrodes. As the electro-conductive agent, carbonaceous materials such as acetylene black, carbon black, and graphite may be used.

The binder increases the adhesiveness between the active material, the electro-conductive agent and the current collector. As the binder, polytetrafluoroethylene (PTFE), polyvinylidene fluoride (PVdF), fluorine rubber, or the like may be used.

In the positive electrode active material-containing layer, the mixing ratios of the positive electrode active material, the electro-conductive agent, and the binder are preferably in ranges of 80 to 95 mass % of the positive electrode active material, 3 to 18 mass % of the electro-conductive agent, and 2 to 7 mass % of the binder.

A density of the positive electrode active material-containing layer 8b is preferably from 2.7 g/cm$^3$ to 3.3 g/cm$^3$. When the density of the positive electrode active material-containing layer 8b is within the above range, the life performance of the battery 20 tends to be high. That is, when the density of the positive electrode active material-containing layer 8b is 3.3 g/cm$^3$ or less, the positive electrode is less likely to form crimples when gas is generated, which can suppress an increase in distance between the electrodes, and thus the battery performance can improve. Further, when the density of the positive electrode active material-containing layer 8b is 2.7 g/cm$^3$ or more, the distance between the positive electrode active material particles is more adequate, and thus the internal resistance tends to decrease.

The negative electrode 9 includes a negative electrode current collector 9c, a negative electrode active material-containing layer 9b, and the negative electrode current collecting tab 9a. The negative electrode current collector 9c has a belt shape having a pair of long sides parallel to the Z-axis direction and a pair of short sides parallel to the X-axis direction. The negative electrode active material-containing layer 9b is provided on at least one main surface of the negative electrode current collector 9c, from one long side to a position between the one long side and the other long side in the X-axis direction. The length from the one long side to the position between the one long side and the other long side is defined as a width $W_{NE}$ of the negative electrode active material-containing layer 9b in a direction parallel to the second direction. That is, the width $W_{NE}$ can be referred to as a length of a short side of the negative electrode active material-containing layer 9b. The negative electrode active material-containing layer 9b is provided on at least one main surface of the negative electrode current collector 9c from one short side to the other short side in the Z-axis direction. The negative electrode current collecting tab 9a is a portion not coated with the negative electrode active material-containing layer 9b on the negative electrode current collector 9c. The negative electrode current collecting tab 9a extends along the X-axis direction in a direction different from that of the positive electrode current collecting tab Ba. The negative electrode current collecting tab 9a may extend in the same direction as that of the positive electrode current collecting tab 8a.

The negative electrode current collector 9c is, for example, a metal foil such as of aluminum, aluminum alloy, copper, or nickel. Note that the negative electrode current collecting tab 9a may be unintegrated with the negative electrode current collector 9c. That is, the negative electrode current collector tab 9a may be implemented by joining a metal foil to one long side of the negative electrode current collector 9c. As the metal foil, the same as that for the negative electrode current collector 9c may be used.

The negative electrode active material-containing layer 9b may be provided on both main surfaces of the negative electrode current collector 9c, or on one of the main surfaces. The negative electrode active material-containing layer 9b includes a negative electrode active material. The negative electrode active material-containing layer 9b may include an electro-conductive agent and a binder in addition to the negative electrode active material.

For the negative electrode active material, it is preferable to use a compound whose lower limit of the potential capable of having lithium ions charged and discharged is 1.0 V (vs. Li/Li$^+$) or more. As such a compound, it is preferable to use a lithium titanium composite oxide. The lithium titanium composite oxide hardly has volume change accompanying charge and discharge reactions. Therefore, use of the lithium titanium composite oxide as the negative electrode active material suppresses the expansion and contraction of the electrodes. Thus, the use of the lithium titanium composite oxide as the negative electrode active material can make crimpling of the electrodes less likely to occur when gas is generated. In addition, the lithium titanium composite oxide has a small amount of heat dissipation associated with charge and discharge. Therefore, the use of the lithium titanium composite oxide as the negative electrode active material can enhance the battery 20 in life performance even when the areas of the long-side lateral walls of the exterior parts 200 are relatively small whereby the heat dissipation is small.

Examples of the lithium titanium composite oxide include $Li_{4+x}Ti_5O_{12}$ (0≤x≤3) having a spinel structure, $Li_{2+y}Ti_3O_7$ (0≤y≤3) having a ramsdellite structure, and an orthorhombic titanium-containing oxide. Examples of the orthorhombic titanium-containing oxide include a sodium-containing niobium titanium composite oxide. Examples of the sodium-containing niobium titanium composite oxide include a compound represented by the general formula $Li_{2+v}Na_{2-w}M1_xTi_{6-y-z}Nb_yM2_zO_{14+\delta}$, where 0≤v≤4, 0<w<2, 0≤x<2, 0<y<6, 0≤z<3, y+z<6, −0.5≤δ≤0.5, M1 includes at least one selected from Cs, K, Sr, Ba, and Ca, and M2 includes at least one selected from Zr, Sn, V, Ta, Mo, W, Fe, Co, Mn, and Al.

When the sodium-containing niobium titanium composite oxide is used as the negative electrode active material, the negative electrode potential can be lowered as compared with the case of using $Li_{4+x}Ti_5O_{12}$, and thus, the voltage of the battery 20 can be increased.

An average primary particle size of the negative electrode active material is preferably 1 μm or less. When the average particle size of the primary particles of the negative electrode active material is small, the internal resistance is small, and thus the heat dissipation associated with charge and discharge tends to be small. Therefore, when the average particle size of the secondary particles of the negative electrode active material is small, the battery 20 can be enhanced in life performance.

The negative electrode active material-containing layer 9b may include a negative electrode active material other than the lithium titanium composite oxide. Examples of such other negative electrode active material include carbonaceous materials such as graphite, and tin-silicon alloy materials.

The electro-conductive agent increases electronic conductivity of the electrodes. As the electro-conductive agent, carbonaceous materials such as acetylene black, carbon black, and graphite may be used.

The binder increases the adhesiveness between the active material, the electro-conductive agent and the current collector. As the binder, polytetrafluoroethylene (PTFE), polyvinylidene fluoride (PVdF), fluorine rubber, styrene-butadiene rubber, or the like may be used.

In the negative electrode active material-containing layer 9b, the mixing ratios of the negative electrode active material, the electro-conductive agent, and the binder are preferably in ranges of 73 to 98 mass % of the negative electrode active material, 0 to 20 mass % of the electro-conductive agent and 2 to 7 mass % of the binder.

The separators 10a and 10b serve as insulating layers. The separators 10a and 10b are, for example, porous films or nonwoven fabrics. The porous films and the nonwoven fabrics each may include at least one compound selected from the group consisting of polyethylene, polypropylene, polyethylene terephthalate, and cellulose. The separators 10a and 10b may be organic fibrous films or inorganic films that coat at least part of the main surfaces of the positive electrode 8 and the negative electrode 9. Further, as the insulating layers, a solid electrolytic layer may be used instead of the separators 10a and 10b.

A thickness of the separators is preferably from 6 μm to 15 μm. When the thickness of the separators is within the above range, the safety, capacity, and life performance of the battery 20 can be enhanced. That is, the thickness of the separator being 6 μm or more may lower the probability of short circuit of the positive electrode and the negative electrode, and thus the safety and reliability of the battery 20 may be improved. On the other hand, with the thickness of the separator being 15 μm or less, an increase in the amount of auxiliary materials in the battery 20 can be suppressed, whereby the energy density can be improved. Further, when the thickness of the separator is 15 μm or less, adequate spaces are present inside the exterior parts 200, whereby the battery 20 is less likely to expand when gas is generated, and thus, the battery performance may improve.

The electrolyte, which is not illustrated, may be held in the positive electrode 8, negative electrode 9, and the separators 10a and 10b. The electrolyte may be a nonaqueous electrode including an electrolyte salt and an organic solvent. Namely, the battery according to the embodiment may be a nonaqueous electrolyte battery. The nonaqueous electrolyte may be liquid or gel. The liquid nonaqueous electrolyte is prepared by dissolving an electrolyte salt in an organic solvent. The gel nonaqueous electrolyte is prepared by gelling the liquid nonaqueous electrolyte using a polymeric material. The concentration of electrolyte salt in the liquid nonaqueous electrolyte is preferably from 0.5 mol/L to 2.5 mol/L.

Examples of the electrolyte include lithium salts such as lithium perchlorate ($LiCl_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), and vinylene carbonate; linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2MeTHF), and dioxolane (DOX); linear ethers such as dimethoxy ethane (DME) and diethoxy ethane (DEE); γ-butyrolactone (GBL), acetonitrile (AN), and sulfolane (SL). Such organic solvents may be used singularly or as a mixed solvent of two or more.

Examples of the polymeric material include polyvinylidene fluoride (PVdF), polyacrylonitrile (PAN), polyethylene oxide (PEO), and the like.

Note, that a room temperature molten salt (ionic melt), which contain lithium ions, and the like may be used as the nonaqueous electrolyte.

The lower limit of the coating width $W_W$ of the electrode group 2 in a direction parallel to the second direction is 85 mm or more according to one example, and 90 mm or more according to another example. The upper limit of the coating width $W_W$ of the electrode group 2 is 130 mm or less according to one example, and 125 mm or less according to another example. Here, the coating width $W_W$ of the electrode group 2 is a larger active material-containing layer width of, the width $W_{PE}$ of the positive electrode active material-containing layer in a direction parallel to the second direction and the width $W_{NE}$ of the negative electrode active material-containing layer in a direction parallel to the second direction. Note that when the width $W_{PE}$ of the positive electrode active material-containing layer and the width $W_{NE}$ of the negative electrode active material-containing layer are the same, either of the widths is defined as the coating width $W_W$.

The coating width $W_W$ of the electrode group 2 can be obtained by a method described below. First, the battery 20 is disassembled in an atmosphere of an inert gas such as argon gas to take out the electrode group 2 from the exterior parts 200. Next, the electrode group 2 is immersed in an organic solvent such as methyl ethyl carbonate for 24 hours. Next, the electrode group 2 is taken out from the organic solvent and further immersed in an organic solvent such as methyl ethyl carbonate for 24 hours. Subsequently, the electrode group 2 is taken out from the organic solvent and vacuum dried at a temperature of 90° C. to remove the electrolyte from the electrode group 2. The washed electrode group 2 is thus obtained.

Next, the washed electrode group 2 is unwound, and the sheet-shaped positive electrode 8 and negative electrode 9 are taken out. Next, in the positive electrode 8 and the negative electrode 9, respectively, the widths of the positive electrode active material-containing layer 8b and the negative electrode active material-containing layer 9b in a direction parallel to the second direction, namely, the widths in directions parallel to the short sides of the positive electrode active material-containing layer 8b and the negative electrode active material-containing layer 9b are measured. The measurement is performed at five places equally spaced along the long side direction in the positive electrode active material-containing layer 8b and the negative electrode active material-containing layer 9b, and the average values thereof are respectively defined as the width $W_{PE}$ of the positive electrode active material-containing layer and the width $W_{NE}$ of the negative electrode active material-containing layer. The larger one of the width $W_{PE}$ and the width $W_{NE}$ is taken as the coating width $W_W$ of the electrode group 2. For the measurement, for example, Digimatic Indicator ID-H0530543 series manufactured by Mitutoyo Corporation or a device having a function equivalent thereto is used.

Figure 4:
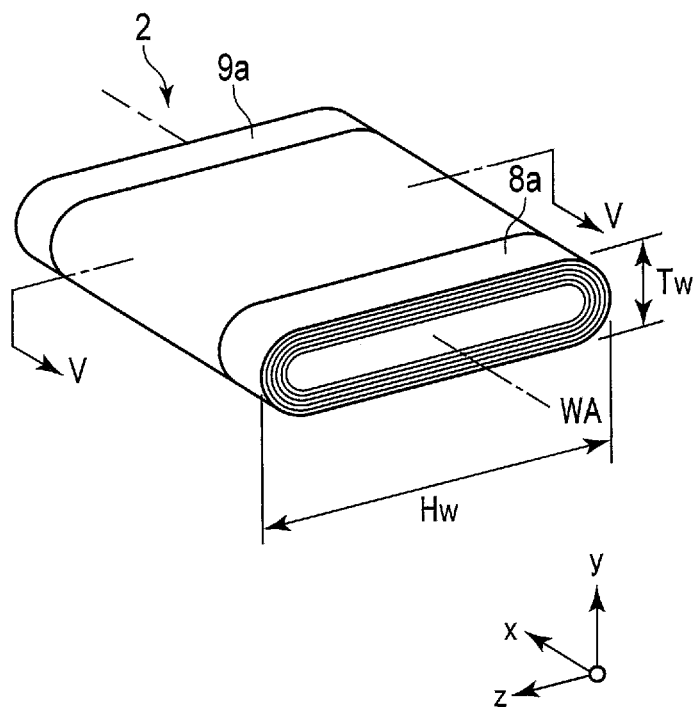
FIG. 4 is a perspective view of the electrode group shown in FIG. 3.

FIG. 4 is a perspective view of the electrode group shown in FIG. 3.

The lower limit of the thickness $T_W$ of the electrode group 2 in a direction parallel to the third direction is 13 mm or more according to one example, and 14 mm or more according to another example. The upper limit of the thickness $T_W$ of the electrode group 2 is 24 mm or less according to one example, and 23 mm or less according to another example. When the thickness $T_W$ of the electrode group 2 is large, the rigidity of the electrode group 2 is increased, and thus, the electrode group 2 is less likely to deform when gas is generated. Therefore, the battery 20 tends to be enhanced in life performance.

The thickness $T_W$ of the electrode group 2 can be obtained by a method described below. First, the washed electrode group 2 is obtained by the same method as described above Next, the washed electrode group 2 is set on a table such that one surface parallel to the XZ plane is the bottom surface. Next, a weight is put on the other surface parallel to the XZ plane so as to impose a load of 100 kPa on this surface. Next, the length from one surface to the other surface of the electrode group 2 at a position at the middle in the X-axis direction and the Z-axis direction, namely, the length of the electrode group 2 in the Y-axis direction is measured with a caliper. The length is defined as the thickness $T_W$ of the electrode group 2. For the measurement, for example, Digimatic Indicator ID-H0530543 series manufactured by Mitutoyo Corporation or a device having a function equivalent thereto is used.

The lower limit of the height $H_W$ of the electrode group 2 in a direction parallel to the first direction is 35 mm or more according to one example, and 40 mm or more according to another example. The upper limit of the height $H_W$ of the electrode group 2 is 75 mm or less according to one example, and 73 mm or less according to another example. When the height $H_W$ of the electrode group 2 is small, the battery 20 tends to be enhanced in life performance.

The height $H_W$ of the electrode group 2 can be obtained by a method described below. First, by the same method as described above, the washed electrode group 2 is set on a table such that one surface parallel to the XZ plane is horizontal. Next, a weight is put on the other surface parallel to the XZ plane so as to impose a load of 100 kPa on this surface. Next, the length of the electrode group 2 in the Z-axis direction is measured with a caliper at a position at the middle in the X-axis direction and the Y-axis direction. The length is defined as the height $H_W$ of the electrode group 2. For the measurement, for example, Digimatic Indicator ID-H0530543 series manufactured by Mitutoyo Co., Ltd. or a device having a function equivalent thereto is used.

A nominal capacity A of the battery 20 is preferably 4 Ah or more, and more preferably 5 Ah or more. That is, the battery 20 according to the embodiment can be suitably used as a high-capacity battery. An upper limit of the nominal capacity is not limited to a particular value, but is, for example, 17 Ah.

The nominal capacity of the battery 20 is a discharge capacity obtained by a method described below. First, the battery is charged with a constant current at a rate of 0.05 C up to the maximum working voltage in an environment of 25° C. Next, the battery is further charged until the current value becomes 0.01 C with the maximum working voltage maintained. Subsequently, the battery is discharged at a rate of 0.05 C to the end voltage to obtain a discharge capacity.

Note that the above-mentioned "maximum working voltage" is a maximum voltage at which the battery can be used without any danger or defect, which is a value unique to each battery. The maximum working voltage is, for example, a voltage such as "a charging voltage" and "a secure maximum voltage" described in a battery specification. Also note that the "end voltage" is a minimum working voltage at which the battery can be used with over-discharge of both the positive electrode and the negative electrode suppressed, namely, with deterioration of the battery suppressed, which is a value unique to each battery.

In the battery 20, the facing area S ($m^2$) and the nominal capacity A (Ah) preferably satisfy the following formula (6).

$$3.5 \leq A/S \leq 10 \tag{6}$$

The above battery 20 can attain both an excellent life performance and an excellent output performance. Namely, the ratio A/S between the nominal capacity A and the facing area S being smaller than 3.5 may indicate that the thickness $T_E$ of the electrode is excessively small. Also, the ratio A/S being larger than 10 may indicate that the thickness $T_E$ of the electrode is excessively large. The ratio A/S is preferably from 3.9 to 10.

Here, the facing area S is an area of one active material-containing layer that is either of the area of the positive electrode active material-containing layer 8b and the area of the negative electrode active material-containing layer 9b in a pair of the positive electrode 8 and the negative electrode 9 facing each other. That is, when the area of the positive electrode active material-containing layer 8b differs from the area of the negative electrode active material-containing layer 9b, the facing area S is an area of the active material-containing layer having the smaller area. When the area of the positive electrode active material-containing layer 8b is equal to the area of the negative electrode active material-containing layer 9b, the facing area S is the area of either active material-containing layer.

Note that when the positive electrode active material-containing layer 8b and the negative electrode active material-containing layer 9b are provided on both main surfaces of their respective current collectors, a sum of the area of the active material-containing layer provided on one main surface of the current collector and the area of the active material-containing layer provided on the other main surface of the current collector is defined as the facing area S.

The facing area S can be calculated in, for example, a manner described below. First, the washed electrode group 2 is obtained by the above-described method. Next, the above electrode group 2 is unwound, and the sheet-shaped positive electrode 8 and negative electrode 9 are taken out. Next, the lengths of the long sides and the lengths of the short sides of the positive electrode active material-containing layer 8b and the negative electrode active material-containing layer 9b respectively provided on one main surface of their respective current collector are measured, to calculate an area of one of the positive electrode active material-containing layer 8b and an area of one of the negative electrode active material-containing layer 9b. Next, the lengths of the long sides and the lengths of the short sides of the positive electrode active material-containing layer 8b and the negative electrode active material-containing layer 9b respectively provided on the other main surface of their respective current collector are measured to calculate an area of the other of the positive electrode active material-containing layer 8b and an area of the other of the negative electrode active material-containing layer 9b. Sums of the one area and the other area thus obtained are defined respectively as areas of the positive electrode active material-containing layer 8b and the negative electrode active material-containing layer 9b. Note that when an active material-containing layer is provided only on one main surface, the calculation of an area of the other is omitted.

When the area of the positive electrode active material-containing layer 8b and the area of the negative electrode active material-containing layer 9b differ from each other, the smaller area is defined as the facing area S. When the area of the positive electrode active material-containing layer 8b and the area of the negative electrode active material-containing layer 9b are equal to each other, either area is defined as the facing area S. For the measurement, for example, Digimatic Indicator ID-H0530543 series manufactured by Mitutoyo Co., Ltd. or a device having a function equivalent thereto is used.

FIG. 5 is a cross-sectional view of the electrode group shown in FIG. 4 taken along the V-V line. The cross-sectional view shown in FIG. 5 is a cross-sectional view obtained by cutting the electrode group 2 in parallel with the YZ plane. In FIG. 5, the boldface solid line indicates the positive electrode 8, the dotted line indicates the negative electrode 9, and the thin solid line indicates the separators 10a and 10b.

As shown in FIG. 5, the innermost surface of the electrode group 2, namely, the innermost circumferential surface, is configured of a part 10b-1 of the separator 10b and a part 9-1 of the negative electrode 9. The portion enclosed by the innermost circumferential surface forms a through hole along a direction orthogonal to the Y-axis direction and the Z-axis direction, namely, along the X-axis direction. The through hole may be closed by parts 10b-i of the separator coming into contact with each other or by the separator 10b-1 coming into contact with the part 9-1 of the negative electrode 9 at the middle of the electrode group 2 along the X-axis direction.

The lower limit of the innermost circumferential height $H_{IC}$ of the electrode group 2 in a direction parallel to the first direction is 26 mm or more according to one example. The upper limit of the height $H_{IC}$ is 53 mm or less according to one example. The innermost circumferential height $H_{IC}$ is approximately equal to the length of the portions in the electrode group 2 where the electrodes extend in the Z-axis direction without curving, namely, straight portions. The electrodes positioned in the straight portions tend to be more likely to crimple when gas is generated within the electrode group, as compared with the electrodes positioned in portions other than the straight portions in the electrode group 2, namely, curved portions. Thus, when the innermost circumferential height $H_{IC}$ of the electrode group 2 is made small, making the proportion of the straight portions in the electrode group 2 reduced, crimples in the electrodes are less likely to arise.

Here, the innermost circumferential height $H_{IC}$ is the distance between the straight line passing through a point P1 and parallel to the Y-axis direction, and the straight line passing through a point P2 and parallel to the Y-axis direction shown in FIG. 5. The points P1 and P2 are positioned farthest from each other in the Z-axis direction on the innermost circumferential surface.

The innermost circumferential height $H_{IC}$ of the electrode group 2 can be determined by a method described below. First, the washed electrode group 2 is obtained by the above-described method. Next, the electrode group 2 is cut in parallel with the YZ plane at five places. Then, creases of the separator 10b positioned at the innermost circumference are examined by eye in the section. That is, in the separator 10b, a portion bent by a large external force applied in winding can be examined by eye as a crease. The crease at the winding start portion of the electrode group 2 is defined as the point P1, and the crease next to the winding start portion is defined as the point P2. Then, the distance between the straight line passing through the point P1 and parallel to the Y-axis direction, and the straight line passing through the point P2 and parallel to the Y-axis direction is measured with a caliper. This procedure is performed on the five cross-sections, and the average value thereof is defined as the innermost circumferential height $H_{IC}$ of the electrode group 2. For the measurement, for example, Digimatic Indicator ID-H0530543 series manufactured by Mitutoyo Corporation or a device having a function equivalent thereto is used.

The description herein has been made, taking the separator 10b as being positioned at the innermost circumference of the electrode group 2; however, note that at the innermost circumference, either the positive electrode or the negative electrode may be positioned. In this case, the crease at the winding start and the crease next to the crease at the winding start of the electrode group 2 are examined in the positive electrode or the negative electrode positioned at the innermost circumference of the electrode group 2, thereby the innermost circumferential height $H_{IC}$ can be obtained by the same method as described with the separator 10b taken as an example.

The thickness $T_W$ (mm) of the electrode group 2 and the innermost circumferential height $H_{IC}$ (mm) of the electrode group 2 preferably satisfy the following formula (5):

$$1.8 \leq H_{IC}/T_W \leq 3.2 \tag{5}$$

Such a battery 20 can achieve an excellent life performance. That is, when the ratio $H_{IC}/T_W$ between the innermost circumferential height $H_{IC}$ of the electrode group 2 and the thickness $T_W$ of the electrode group is 1.8 or more, upon gas generation, the gas is more easily released from the electrode group 2 to the outside. In addition, when the ratio $H_{IC}/T_W$ is 3.2 or less, the electrode group 2 has an adequate strength to hold its shape, and therefore, deformation of the electrode group 2 may be suppressed when gas is generated.

Figure 6:
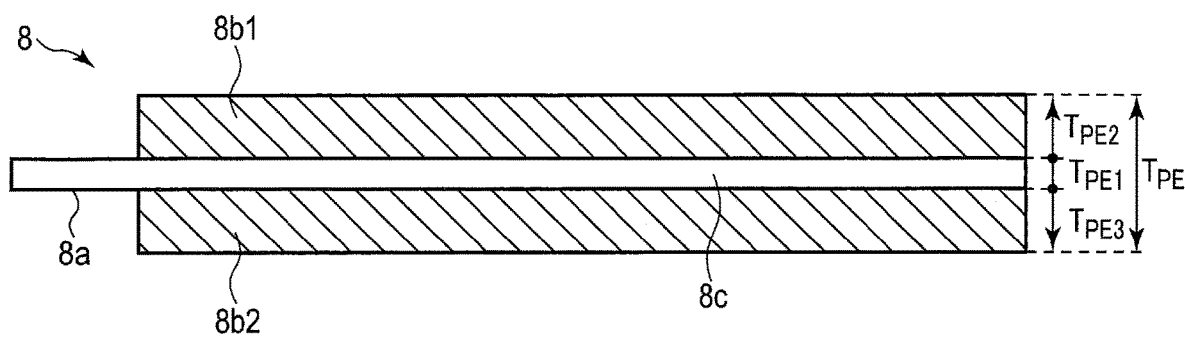
FIG. 6 is a cross-sectional view of a positive electrode included in the electrode group shown in FIGS. 3 to 5.

FIG. 6 is a cross-sectional view of the positive electrode included in the electrode group shown in FIGS. 3 to 5. The positive electrode 8 shown in FIG. 6 includes a positive electrode current collector 8c, a positive electrode active material-containing layer 8b1 provided on one main surface of the positive electrode current collector 8c, a positive electrode active material-containing layer 8b2 provided on the other main surface of the positive electrode current collector 8c, and a positive electrode current collecting tab 8a.

A thickness $T_{PE}$ of the positive electrode is the sum of a thickness $T_{PE1}$ of the positive electrode current collector 8c, a thickness $T_{PE2}$ of the positive electrode active material-containing layer 8b1, and a thickness $T_{PE3}$ of the positive electrode active material-containing layer 8b2. Note that when the positive electrode active material-containing layer 8b is provided only on one of the surfaces of the positive electrode current collector 8c, the thickness $T_{PE}$ of the positive electrode is the sum of the thickness $T_{PE1}$ of the positive electrode current collector 8c and the thickness $T_{PE2}$ of the positive electrode active material-containing layer 8b1 or the thickness $T_{PE3}$ of the positive electrode active material-containing layer 8b2. A thickness $T_{NE}$ of the negative electrode can also be determined by the same method as the thickness $T_{PE}$ of the positive electrode.

The thickness $T_{PE}$ of the positive electrode may be either equal to or different from the thickness $T_{NE}$ of the negative electrode. The thickness $T_{PE}$ of the positive electrode is preferably thicker than the thickness $T_{NE}$ of the negative electrode. When the thickness $T_{PE}$ of the positive electrode is thicker than the thickness $T_{NE}$ of the negative electrode, the safety of the battery 20 tends to be high.

A thickness $T_E$ of the electrode can be determined by a method described below. First, the washed electrode group 2 is obtained by the above-described method. Next, the electrode group 2 is unwound, and the sheet-shaped positive electrode 8 and negative electrode 9 are taken out. Then, in the positive electrode 8 and the negative electrode 9, the thickness of the positive electrode and the negative electrode is measured at 50 points where the positive electrode active material-containing layer 8b and the negative electrode active material-containing layer 9b are provided, and the average value thereof is determined as a thickness of each electrode. The 50 points are points where ten straight lines parallel to the short side that are equally spaced along the long side direction, intersect with five straight lines parallel to the long side that are equally spaced along the short side direction, in the positive electrode active material-containing layer 8b and the negative electrode active material-containing layer 9b. Of the thicknesses $T_{PE}$ and $T_{NE}$ thus obtained, the larger thickness is defined as the thickness $T_E$ of the electrode. Note that when the thicknesses $T_{PE}$ and $T_{NE}$ have the same value, either of the thicknesses is defined as the thickness $T_E$ of the electrode.

The thickness $T_E$ of the electrode is from 0.03 mm to 0.08 mm. That is, the thickness $T_E$ of the electrode is from 30 μm to 80 μm. When the thickness $T_E$ of the electrode is within the above range, the battery 20 can be enhanced in life performance. That is, if the thickness $T_E$ of the electrode is less than 0.03 mm, the rigidity of the electrode would be so low that the electrode is more likely to form crimples when releasing gas. On the other hand, if the thickness $T_E$ of the electrode is larger than 0.08 mm, the rigidity of the electrode would be excessively high, which makes gaps difficult to be provided between the electrodes when gas is generated, and making gas difficult to be released from the electrodes. Therefore, the gas stay between the electrodes, whereby localized large gaps may be generated. Further, if the thickness $T_E$ of the electrode is larger than 0.08 mm, the internal resistance would increase, and the heat generated accompanying charge and discharge thus would increase.

The thickness $T_E$ of the electrode, the thickness $T_W$ of the electrode group, and the innermost circumferential height $H_{IC}$ of the electrode group satisfy the following formula (1):

$$0.02 \leq (T_E \times T_W)/H_{IC} \leq 0.04 \tag{1}$$

Such an electrode group 2 can be said to have a lesser thickness $T_E$ of the electrode, a greater thickness $T_W$ of the electrode group 2, and a lesser inner circumferential surface height $H_{IC}$ of the electrode group 2, as compared with the conventional electrode group. In such an electrode group 2, rigidity of the electrode group 2 itself is high because of the relatively large thickness of the electrode group 2, and even when the thickness $T_E$ of the electrode is relatively small, the electrode is less likely to form crimples when gas is generated within the electrode group. Further, because of the relatively small inner circumferential surface height $H_{IC}$, the proportion occupied by the straight portions in the electrode group 2 is small, and the electrodes are still less likely to form crimples. From the above, the battery satisfying the above formula (1) can achieve excellent life performance. The ratio $(T_E \times T_W)/H_{IC}$ between the product of the electrode thickness $T_E$ and the electrode group thickness $T_W$ and the innermost circumferential height $H_{IC}$ of the electrode group is preferably from 0.02 to 0.033.

The thickness $T_E$ (mm) of the electrode and the height $H_W$ (mm) of the electrode group preferably satisfy the following formula (2):

$$800 \leq H_W/T_E \leq 1500 \tag{2}$$

By virtue of including the above electrode group 2, the battery 20 can be enhanced in life performance. That is, when the ratio $H_W/T_E$ between the height $H_W$ of the electrode group and the thickness $T_E$ of the electrode is 800 or more, upon gas generation, the gas easily escapes from the electrodes and is less likely to accumulate between the electrodes, and a localized increase in distance between the electrodes tends to be suppressed. Therefore, when the ratio $H_W/T_E$ is 800 or more, the internal resistance of the battery 20 may be lowered and the capacity may improve. Further, when the ratio $H_W/T_E$ is 1500 or less, the electrode is less likely to form crimples when gas is generated, which, in turn, may lower the internal resistance of the battery 20 and improve the capacity.

The thickness $T_E$ of the electrode and the coating width $W_W$ of the electrode group preferably satisfy the following formula (3):

$$1600 \leq W_W/T_E \leq 2500 \tag{3}$$

The battery 20 including such an electrode group 2 tends to have a high life performance. That is, when the ratio $W_W/T_E$ between the coating width $W_W$ of the electrode group and the thickness $T_E$ of the electrode is from 1600 to 2500, upon gas generation, the gas easily escapes from the electrodes, and also, crimples tends to be less apt to occur in the electrode group. Therefore, when the electrode group having a ratio $W_W/T_E$ of from 1600 to 2500 is used, the battery performance is less likely to deteriorate when gas is generated.

The thickness $T_W$ of the electrode group and the thickness $T_E$ of the electrode preferably satisfy the following formula (4):

$$250 \leq T_W/T_E \leq 450 \tag{4}$$

Such a battery 20 can have an enhanced life performance. Namely, when the ratio $T_W/T_E$ between the thickness $T_W$ of the electrode group and the thickness $T_E$ of the electrode is 250 or more, the electrode group 2 has an adequate strength to hold its shape, which can suppress deformation of the electrode group 2 when gas is generated. Further, when the ratio $T_W/T_E$ is 450 or less, upon gas generation, the gas easily escapes from the electrode group 2 to the outside, and the battery performance may improve.

The battery according to the above-described embodiment includes the electrode having the relatively small thickness of 0.08 mm or less. In the battery according to the first embodiment, by making the ratio $(T_E \times T_W)/H_{IC}$ between the product of the electrode thickness $T_E$ and the electrode group thickness $T_W$ and the innermost circumferential height $H_{IC}$ of the electrode group be from 0.02 to 0.04, even when including the electrode with the relatively small thickness, crimpling of the electrode can be made less apt to occur. Thus, the battery according to the embodiment can achieve excellent life performance. In addition, the battery according to the embodiment can attain both excellent life performance and excellent input/output performance. Further, the battery according to the embodiment is suitably used as a secondary battery.

Second Embodiment

According to a second embodiment, a battery pack is provided. The battery pack according to the second embodiment includes the battery according to the first embodiment. The number of batteries (single-batteries) included in the battery pack may be one or plural.

The plural batteries may be electrically connected in series, in parallel or in combination of in-series and in-parallel connections to configure a battery module. The battery pack may include plural battery modules.

The battery pack may further include a protective circuit. The protective circuit has a function to control charging and discharging of the battery(s). Alternatively, a circuit included in equipment where the battery pack serves as a power source (for example, electronic devices, automobiles, and the like) may be used as the protective circuit for the battery pack.

In addition, the battery pack may further include an external power distribution terminal. The external power distribution terminal is configured to externally output current from the battery(s), and to input external current into the secondary battery(s). In other words, when the battery pack is used as a power source, the current is provided out via the external power distribution terminal. When the battery pack is charged, the charging current (including regenerative energy of motive force of automobiles) is provided to the battery pack via the external power distribution terminal.

Next, an example of a battery pack according to the second embodiment will be described with reference to the drawings.

Figure 7:
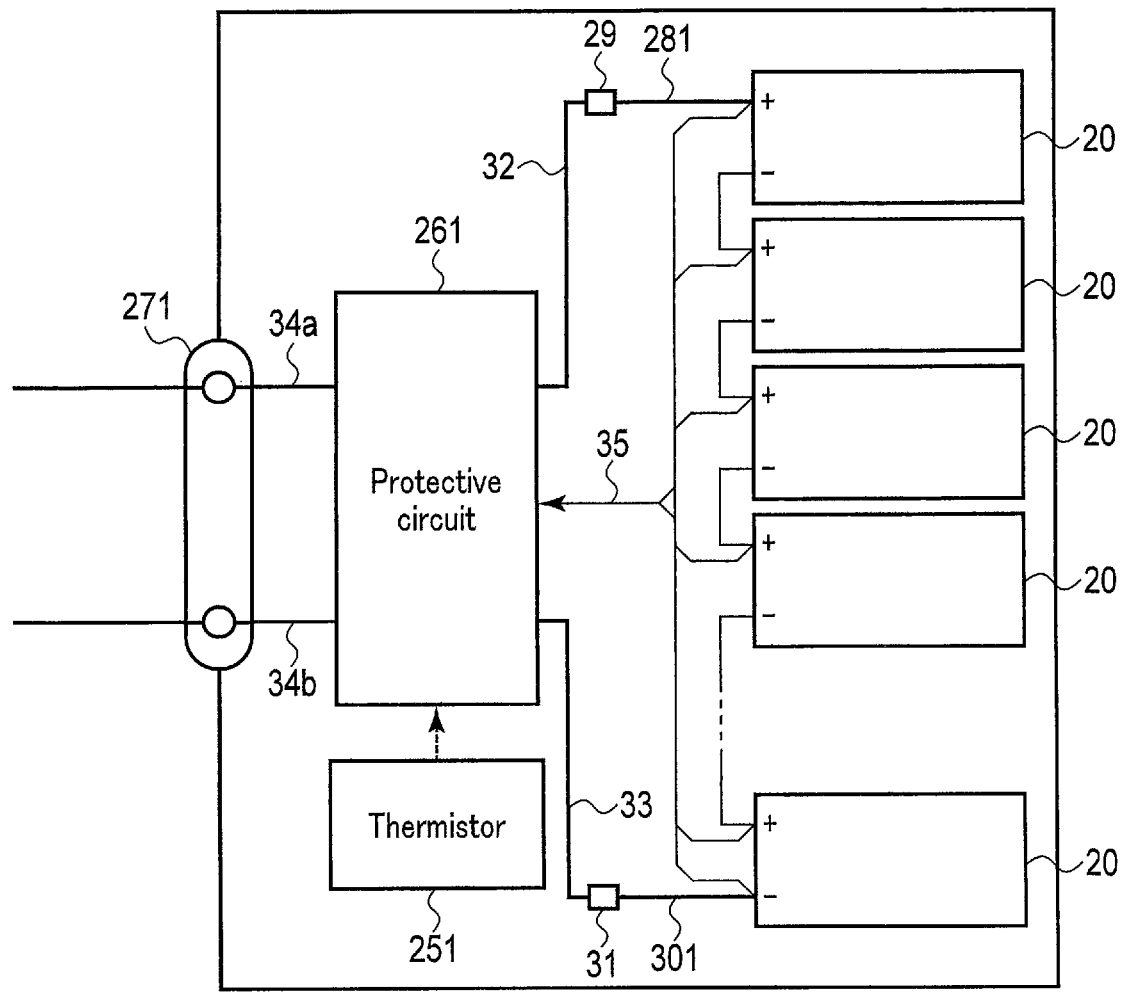
FIG. 7 is a block diagram showing an example of an electric circuit of a battery pack according to an embodiment.

FIG. 7 is a block diagram showing an example of an electric circuit of the battery pack according to the embodiment. The battery pack shown in FIG. 7 includes plural flat batteries 20.

The plural single-batteries 20 are stacked such that externally protruding negative electrode terminals and positive electrode terminals are arranged in the same direction, and are fastened by an adhesive tape to configure a battery module. The single-batteries 20 are electrically connected in series, as shown in FIG. 7.

A printed wiring board is arranged facing the side surfaces of the plural single-batteries 20 from which the negative electrode terminals and the positive electrode terminals protrude out. As shown in FIG. 7, a thermistor 251, a protective circuit 261, and an energizing terminal 271 for energization to external device(s) are mounted on the printed wiring board. Note, that an insulating plate (not shown) is attached to the surface of the printed wiring board facing the battery module to avoid unwanted connection to the wires of the battery module.

A positive electrode-side electrode lead 281 is connected to the positive electrode terminal of the single-battery 20 located lowermost in the battery module, and a distal end thereof is inserted into a positive electrode-side electrode connector 29 of the printed wiring board and electrically connected thereto. A negative electrode-side electrode lead 301 is connected to the negative electrode terminal of the single-battery 20 located uppermost in the battery module, and a distal end thereof is inserted into a negative electrode-side connector 31 of the printed wiring board and electrically connected thereto. The connectors 29 and 31 are connected to the protective circuit 261 via wirings 32 and 33 formed on the printed wiring board.

The thermistor 251 detects the temperature of the single-batteries 20, and the detection signal is transmitted to the protective circuit 261. The protective circuit 261 can cutoff a plus-side wiring 34a and a minus-side wiring 34b between the protective circuit 261 and the energizing terminal 271 to external device(s) under a predetermined condition. An example of predetermined condition is, for example, when a signal is received from the thermistor 251 indicating that a temperature of the single-battery(s) 20 is a predetermined temperature or more. Another example of predetermined condition is, when overcharge, over-discharge, an overcurrent, or the like of the single-battery(s) 20 is detected. Detection of the overcharge and the like is done for each single-battery 20 or for all the single-batteries 20. When performing detection for each single-battery 20, the battery voltage may be detected, or the positive electrode potential or negative electrode potential may be detected. In the latter case, a lithium electrode used as a reference electrode is inserted into each single-battery 20. In the battery pack of FIG. 7, a wire 35 for voltage detection is connected to each of the single-batteries 20, and a detection signal is transmitted to the protective circuit 261 via the wires 35.

Although the battery pack shown in FIG. 7 has a form where plural single-batteries 20 are connected in series, the battery pack according to the second embodiment may have the single-batteries be connected in parallel, in order to increase the battery capacity. Alternatively, the battery pack according to the second embodiment may include plural single-batteries 20 connected with a combination of in-series connection and in-parallel connection. Assembled battery packs may further be connected in series or in parallel, also.

In addition, while the battery pack shown in FIG. 7 includes plural single-batteries 20, the battery pack according to the second embodiment may be one that includes one single battery 20.

The form of the battery pack can be appropriately changed depending on applications. As the application of the battery pack, one for which good cycle performance during a large current performance is preferable. More specifically, examples of the applications include power source for a digital camera and onboard applications for a two-wheeled or four-wheeled hybrid electric vehicle, a two-wheeled or four-wheeled electric vehicle, or a power-assisted bicycle. In particular, onboard applications are preferable.

In an automobile to which is installed the battery pack according to the embodiment, the battery pack, for example, recovers regenerative energy of motive force of the automobile.

The battery pack according to the second embodiment described above in detail includes the battery according to the first embodiment. Therefore, the battery pack according to the second embodiment can attain excellent life performance.

EXAMPLES

Examples will be described below.

Example 1

[Production of Positive Electrode]

As a positive electrode active material, the lithium-nickel-cobalt-manganese composite oxide $LiNi_{0.33}Co_{0.33}Mn_{0.33}O_2$ was prepared. The positive electrode active material, acetylene black, graphite, and polyvinylidene fluoride were mixed at a mass ratio of 100:2:3:3 to obtain a mixture. The mixture was mixed with N-methyl-2-pyrrolidone, and then kneaded and stirred with a planetary mixer to prepare a positive electrode slurry. The positive electrode slurry was applied onto both main surfaces of an aluminum foil having a thickness of 12 μm so as to have a partially uncoated portion, and the coating was dried. The dried coating was compressed with a roll press, thereby producing a positive electrode.

[Production of Negative Electrode]

As a negative electrode active material, the lithium titanate $Li_4Ti_5O_{12}$ was prepared. The negative electrode active material, graphite, and polyvinylidene fluoride were mixed at a mass ratio of 100:10:5 to obtain a mixture. The mixture was mixed with N-methyl-2-pyrrolidone, and then kneaded and stirred with a planetary mixer to prepare a negative electrode slurry. The negative electrode slurry was applied onto both main surfaces of an aluminum foil having a thickness of 12 μm so as to have a partially uncoated portion, and the coating was dried. The dried coating was compressed with a roll press, thereby producing a negative electrode.

[Production of Electrode Group]

The negative electrode, a first separator, the positive electrode, and a second separator were stacked in this order to obtain a stack. As the first and second separators, a nonwoven fabric made of cellulose having a thickness of 14 μm was used. The first and second separators had a porosity of 60%. Then, the stack was transferred to a winding device and spirally wound. Then, a pressing treatment was performed on the wound stacked body, thereby obtaining a flat-shaped electrode group.

[Preparation of Liquid Nonaqueous Electrolyte]

Ethylene carbonate and dimethyl carbonate were mixed at a volume ratio of 1:1 to prepare a nonaqueous solvent. Lithium hexafluorophosphate ($LiPF_6$) as electrolyte was dissolved in the nonaqueous solvent so as to have a concentration of 1 mol/L. A liquid nonaqueous electrolyte was thus prepared.

[Battery Assembly]

A sealing plate including a positive electrode lead electrically connected to a positive electrode terminal and a negative electrode lead electrically connected to a negative electrode terminal was prepared. The positive electrode non-coated portion situated at one end of the electrode group was ultrasonically joined to the positive electrode lead. Also, the negative electrode non-coated portion situated at the other end of the electrode group was ultrasonically joined to the negative electrode lead. By the method described above, the sealing plate was attached to the electrode group. Then, the electrode group was inserted into an external container, and the sealing plate and the external can were welded. Next, the liquid nonaqueous electrolyte was put into the external container from an inlet provided on the sealing plate. Subsequently, a seal member made of aluminum was fitted into the inlet, and the periphery of the seal member was welded to the sealing body. By the method described above, the battery was obtained.

Examples 2 to 12 and Comparative Examples 1 to 3

Batteries according to Examples 2 to 12 and Comparative Examples 1 to 3 were obtained by the same method as described in Example 1 except that changes were made to the specie of the positive electrode active material, the specie of the negative electrode active material, the density of the positive electrode active material-containing layer, the thickness of the positive electrode, the thickness of the negative electrode, the thickness of the separator, the size of the exterior parts, the size of the electrode group, etc, as shown in Tables 1 to 3 below.

<Evaluation Test>

[Cycling Test]

First, the battery was charged with a constant current at a rate of 0.05 C up to the maximum working voltage in an environment of 25° C. Then, the battery was further charged until the current value had become 0.01 C, with the maximum working voltage maintained. Subsequently, the battery was discharged at a rate of 0.05 C to the end voltage, and a discharge capacity was obtained. The discharge capacity thus obtained was taken as a nominal capacity A. Taking the above charge and discharge of the battery as one cycle, 1000 cycles were performed under a 55° C. environment. The discharge capacity of the battery after the 1000 cycles was measured and taken as a discharge capacity A1. The ratio of the discharge capacity A1 to the nominal capacity A was calculated as a capacity retention ratio.

The battery according to Examples 1 to 8 and 12 and Comparative Examples 1 to 3 had a maximum working voltage of 2.8 V, and an end voltage of 1.3 V. The battery according to Examples 9 and 10 had a maximum working voltage of 2.9 V, and an end voltage of 1.5 V. The battery according to Example 11 had a maximum working voltage of 3.1 V, and a final voltage of 1.5 V.

Then, the thickness $T_{C1}$ of the exterior parts after the cycling test was measured. As a result, the thickness $T_{C1}$ of the exterior parts after the cycling test was approximately the same in Examples 1 to 12 and Comparative Examples 1 to 3. This shows that gas was generated within the exterior parts in all the batteries through the cycling test.

These results are shown in Table 3.

Table 1 below summarizes the data relevant to the positive electrode, the negative electrode and the separator.

TABLE 1

| | Positive Electrode | | | | Negative Electrode | | | Separator |
|---|---|---|---|---|---|---|---|---|
| | Active Material | Density (g/cm³) | Thickness $T_{PE}$ (mm) | Width $W_{PE}$ (mm) | Active Material | Thickness $T_{NE}$ (mm) | Width $W_{NE}$ (mm) | Thickness (μm) |
| Example 1 | $LiNi_{0.33}Co_{0.33}Mn_{0.33}O_2$ | 3.1 | 0.068 | 120 | $Li_4Ti_5O_{12}$ | 0.054 | 122 | 14 |
| Example 2 | $LiNi_{0.5}Co_{0.2}Mn_{0.3}O_2$ | 3.1 | 0.065 | 120 | $Li_4Ti_5O_{12}$ | 0.075 | 122 | 12 |
| Example 3 | $LiNi_{0.5}Co_{0.2}Mn_{0.3}O_2$ | 3.2 | 0.049 | 120 | $Li_4Ti_5O_{12}$ | 0.045 | 122 | 10 |
| Example 4 | $LiNi_{0.5}Co_{0.2}Mn_{0.3}O_2$ | 3.2 | 0.049 | 89 | $Li_4Ti_5O_{12}$ | 0.045 | 91 | 10 |
| Example 5 | $LiNi_{0.5}Co_{0.2}Mn_{0.3}O_2$ | 3.2 | 0.049 | 89 | $Li_4Ti_5O_{12}$ | 0.045 | 91 | 10 |
| Example 6 | $LiNi_{0.5}Co_{0.2}Mn_{0.3}O_2$ | 3.1 | 0.068 | 120 | $Li_4Ti_5O_{12}$ | 0.054 | 122 | 14 |
| Example 7 | $LiNi_{0.5}Co_{0.2}Mn_{0.3}O_2$ | 3.1 | 0.068 | 120 | $Li_4Ti_5O_{12}$ | 0.054 | 122 | 14 |
| Example 8 | $LiNi_{0.5}Co_{0.2}Mn_{0.3}O_2$ | 3.2 | 0.044 | 98 | $Li_4Ti_5O_{12}$ | 0.036 | 100 | 10 |
| Example 9 | $Li_2MnO_4$ | 2.7 | 0.062 | 109 | $Li_4Ti_5O_{12}$ | 0.051 | 111 | 14 |
| Example 10 | $Li_2MnO_4$ | 2.7 | 0.062 | 105 | $Li_4Ti_5O_{12}$ | 0.051 | 107 | 14 |
| Example 11 | $Li_2MnO_4$ | 2.7 | 0.062 | 105 | $Li_2Na_2Ti_{5.5}Nb_{0.5}O_{14}$ | 0.051 | 107 | 14 |
| Example 12 | $LiNi_{0.5}Co_{0.2}Mn_{0.3}O_2$ | 3.2 | 0.044 | 98 | $Li_4Ti_5O_{12}$ | 0.036 | 100 | 6 |
| Comparative Example 1 | $LiNi_{0.5}Co_{0.2}Mn_{0.3}O_2$ | 3.1 | 0.065 | 114 | $Li_4Ti_5O_{12}$ | 0.054 | 116 | 10 |
| Comparative Example 2 | $LiNi_{0.5}Co_{0.2}Mn_{0.3}O_2$ | 3.2 | 0.049 | 110 | $Li_4Ti_5O_{12}$ | 0.045 | 112 | 12 |
| Comparative Example 3 | $LiNi_{0.5}Co_{0.2}Mn_{0.3}O_2$ | 3.2 | 0.049 | 121 | $Li_4Ti_5O_{12}$ | 0.045 | 123 | 12 |

Table 2 below summarizes the data relevant to the electrode group.

TABLE 2

| | Electrode Group | | | | | | | | | |
|---|---|---|---|---|---|---|---|---|---|---|
| | Thickness $T_E$ (mm) | Coating Width $W_W$ (mm) | Thickness $T_W$ (mm) | Height $H_W$ (mm) | Height $H_{IC}$ (mm) | $W_W/T_E$ | $T_W/T_E$ | $H_W/T_E$ | $H_{IC}/T_W$ | $(T_E \times T_W)/H_{IC}$ |
| Example 1 | 0.068 | 122 | 22 | 70 | 48 | 1794 | 324 | 1029 | 2.2 | 0.031 |
| Example 2 | 0.075 | 122 | 20 | 65 | 45 | 1627 | 267 | 867 | 2.3 | 0.033 |
| Example 3 | 0.049 | 122 | 17 | 58 | 41 | 2490 | 347 | 1184 | 2.4 | 0.020 |
| Example 4 | 0.049 | 91 | 22 | 73 | 51 | 1857 | 449 | 1490 | 2.3 | 0.021 |
| Example 5 | 0.049 | 91 | 14 | 40 | 26 | 1857 | 286 | 816 | 1.9 | 0.026 |
| Example 6 | 0.068 | 122 | 23 | 70 | 47 | 1794 | 338 | 1029 | 2.0 | 0.033 |
| Example 7 | 0.068 | 122 | 17 | 70 | 53 | 1794 | 250 | 1029 | 3.1 | 0.022 |
| Example 8 | 0.044 | 100 | 19 | 60 | 41 | 2273 | 432 | 1364 | 2.2 | 0.020 |
| Example 9 | 0.062 | 111 | 20 | 68 | 48 | 1790 | 323 | 1097 | 2.4 | 0.026 |
| Example 10 | 0.062 | 107 | 22 | 68 | 46 | 1726 | 355 | 1097 | 2.1 | 0.030 |
| Example 11 | 0.062 | 107 | 20 | 68 | 48 | 1726 | 323 | 1097 | 2.4 | 0.026 |
| Example 12 | 0.044 | 100 | 19 | 60 | 41 | 2273 | 432 | 1364 | 2.2 | 0.020 |
| Comparative Example 1 | 0.065 | 116 | 22 | 100 | 78 | 1785 | 338 | 1538 | 7.1 | 0.018 |
| Comparative Example 2 | 0.049 | 112 | 14 | 137 | 123 | 2286 | 286 | 2796 | 17.6 | 0.006 |
| Comparative Example 3 | 0.049 | 123 | 14 | 60 | 46 | 2510 | 286 | 1224 | 6.6 | 0.015 |

Table 3 below summarizes the data relevant to the battery. Note that for Examples 1 to 12 and Comparative Examples 1 to 3 in Table 3, the facing area S is the area of the positive electrode active material-containing layer.

TABLE 3

| | Battery | | | | | | | | | Cycling Test | |
|---|---|---|---|---|---|---|---|---|---|---|---|
| | Long-side Lateral Wall Thickness (mm) | Width $W_C$ (mm) | Thickness $T_C$ (mm) | Height $H_C$ (mm) | $W_C/T_C$ | $H_C/T_C$ | Nominal Capacity A (Ah) | Opposing Area S (m$^2$) | A/S | Thickness $T_{C1}$ After Test (mm) | Capacity Retention Ratio (%) |
| Example 1 | 0.5 | 142 | 23 | 75 | 6.2 | 3.3 | 14.9 | 2.25 | 6.6 | 25 | 98 |
| Example 2 | 0.5 | 136 | 21 | 70 | 6.5 | 3.3 | 17.3 | 1.74 | 9.9 | 26 | 99 |
| Example 3 | 2 | 129 | 21 | 63 | 6.1 | 3.0 | 9.9 | 1.91 | 5.2 | 25 | 98 |
| Example 4 | 0.5 | 104 | 23 | 78 | 4.5 | 3.4 | 12 | 2.11 | 5.7 | 25 | 99 |
| Example 5 | 2 | 98 | 18 | 45 | 5.4 | 2.5 | 4.1 | 0.79 | 5.2 | 26 | 99 |
| Example 6 | 0.5 | 142 | 24 | 75 | 5.9 | 3.1 | 15.5 | 2.35 | 6.6 | 26 | 99 |
| Example 7 | 2 | 129 | 21 | 73 | 6.1 | 3.5 | 8.7 | 1.96 | 4.4 | 25 | 98 |
| Example 8 | 0.5 | 120 | 20 | 65 | 6.0 | 3.3 | 7.9 | 2.00 | 4.0 | 25 | 98 |
| Example 9 | 0.5 | 131 | 21 | 73 | 6.2 | 3.5 | 14 | 2.40 | 5.8 | 26 | 99 |
| Example 10 | 0.5 | 127 | 23 | 73 | 5.5 | 3.2 | 14 | 2.30 | 6.1 | 26 | 98 |
| Example 11 | 0.5 | 127 | 21 | 73 | 6.0 | 3.5 | 15 | 2.30 | 6.5 | 26 | 97 |
| Example 12 | 0.5 | 120 | 20 | 65 | 6.0 | 3.3 | 8.7 | 2.22 | 3.9 | 25 | 98 |
| Comparative Example 1 | 0.5 | 136 | 23 | 105 | 5.9 | 4.6 | 22.3 | 3.38 | 6.6 | 25 | 79 |
| Comparative Example 2 | 0.5 | 132 | 15 | 142 | 8.8 | 9.5 | 17.7 | 3.41 | 5.2 | 26 | 78 |
| Comparative Example 5 | 0.5 | 143 | 15 | 65 | 9.5 | 4.3 | 8.3 | 1.60 | 5.2 | 25 | 83 |

As is clear from Tables 2 and 3, the batteries according to Examples 1 to 12 having the ratio $(T_E \times T_W)/H_{IC}$ between the product of the electrode thickness $T_E$ and the electrode group thickness $T_W$ and the innermost circumferential height $H_{IC}$ of the electrode group of from 0.02 to 0.04 had a higher capacity retention ratio than the capacity retention ratios of the batteries according to Comparative Examples 1 to 3 having a ratio $(T_E \times T_W)/H_{IC}$ of less than 0.02.

Further, as is clear from the comparison between Example 1 and Example 2, the high capacity retention ratio was attained regardless of whether the positive electrode was thicker than the negative electrode or the negative electrode was thicker than the positive electrode.

Further, as is clear from the comparison of Examples 1, 2, 9, and 12, the high capacity retention ratio was attained even when the species of the negative electrode active material were different. Further, as is clear from the comparison between Example 9 and Example 1, the high capacity retention ratio was attained when the species of the positive electrode active material were different.

The battery according to the above-described embodiment includes electrodes of a relatively small thickness of 0.08 mm or less. In the battery according to the first embodiment, by having the ratio between the product of the thickness $T_E$ of the electrode(s) and the thickness $T_W$ of the electrode, and the innermost circumferential height $H_{IC}$ (mm) of the electrode group $(T_E \times T_W)/H_{IC}$ be 0.02 or greater and 0.04 or less, crimples in the electrode can be made less likely to be generated. Thereby, the battery according to the embodiment can achieve excellent life performance. In addition, the battery according to the embodiment can accomplish both an excellent life performance and an excellent input/output performance.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A battery comprising:
    an external container comprising a bottom wall and a lateral wall extending from the bottom wall in a first direction, the external container being provided with an opening portion opposing the bottom wall;
    an electrode group comprising a positive electrode, a negative electrode, and an insulating layer, the positive electrode and the negative electrode being wound in a flat shape with the insulating layer interposed therebetween, and the electrode group being housed within the external container such that a winding axis direction is orthogonal to the first direction; and
    a sealing plate attached to the opening portion of the external container,
    a thickness $T_{PE}$ of the positive electrode and a thickness $T_{NE}$ of the negative electrode being equal to or different from each other, and each being from 0.03 mm to 0.08 mm, and
    taking a direction parallel to the winding axis direction as a second direction and taking a direction orthogonal to the first direction and the second direction as a third direction, a thickness $T_E$ (mm) which is a larger thickness of the thicknesses $T_{PE}$ and $T_{NE}$ or either of the thicknesses $T_{PE}$ and $T_{NE}$ when the thicknesses $T_{PE}$ and $T_{NE}$ are equal, a thickness $T_W$ (mm) of the electrode group in a direction parallel to the third direction, and an innermost circumferential height $H_{1C}$ (mm) of the electrode group in a direction parallel to the first direction satisfying following formula (1), the innermost circumferential height $H_{1C}$ being a distance between a straight line passing through a point P1 and parallel to the third direction, and a straight line passing through a point P2 and parallel to the third direction, the points P1 and P2 being positioned farthest from each other in the first direction on an innermost circumferential surface of the electrode group:

$$0.02 \leq (T_E \times T_W)/H_{1C} \leq 0.04 \quad (1).$$

2. The battery according to claim 1, wherein the negative electrode comprises a lithium titanium composite oxide.

3. The battery according to claim 1, wherein a height $H_W$ (mm) of the electrode group in a direction parallel to the first direction and the thickness $T_E$ (mm) of the electrode satisfy following formula (2):

$$800 \leq H_W/T_E \leq 1500 \qquad (2).$$

4. The battery according to claim 1, wherein:
the positive electrode comprises a positive electrode current collector and a positive electrode active material-containing layer provided on at least one side of the positive electrode current collector, the positive electrode active material-containing layer comprising a positive electrode active material;
the negative electrode comprises a negative electrode current collector and a negative electrode active material-containing layer provided on at least one side of the negative electrode current collector, the negative electrode active material-containing layer comprising a negative electrode active material;
a width of the positive electrode active material-containing layer in a direction parallel to the second direction, and a width of the negative electrode active material-containing layer in a direction parallel to the second direction are equal to or different from each other; and
taking at least one of the widths as an electrode group coating width $W_W$, the electrode group coating width $W_W$ (mm) and the thickness $T_E$ (mm) of the electrode satisfy following formula (3):

$$1600 \leq W_W/T_E \leq 2500 \qquad (3).$$

5. The battery according to claim 1, wherein the thickness $T_E$ (mm) of the electrode and the thickness $T_W$ (mm) of the electrode group satisfy following formula (4):

$$250 \leq T_W/T_E \leq 450 \qquad (4).$$

6. The battery according to claim 1, wherein the thickness $T_W$ (mm) of the electrode group and the innermost circumferential height $H_{1C}$ (mm) of the electrode group satisfy following formula (5):

$$1.8 \leq H_{IC}/T_W \leq 3.2 \qquad (5).$$

7. The battery according to claim 1, wherein:
the positive electrode comprises a positive electrode current collector and a positive electrode active material-containing layer provided on at least one side of the positive electrode current collector, the positive electrode active material-containing layer comprising a positive electrode active material; and
the positive electrode active material active material-containing layer has a density of from 2.7 g/cm³ to 3.3 g/cm³.

8. The battery according to claim 1, wherein the insulating layer is a separator having a thickness of from 6 μm to 15 μm.

9. The battery according to claim 4, wherein;
an area of the positive electrode active material-containing layer and an area of the negative electrode active material-containing layer are equal to or different from each other; and
taking at least one of the areas as a facing area S, the facing area S (m²) and a nominal capacity A (Ah) of the battery satisfy following formula (6):

$$3.5 \leq A/S \leq 10 \qquad (6).$$

10. The battery according to claim 1, wherein:
the bottom wall has a rectangular shape having a pair of long sides parallel to the second direction and a pair of short sides parallel to the third direction,
the external container has a shape of a prismatic can including the bottom wall and the lateral wall, the lateral wall including a pair of long-side lateral walls extending from the pair of long sides of the bottom wall in the first direction and a pair of short-side lateral walls extending from the pair of short sides of the bottom wall in the first direction; and
the long-side lateral walls have plate thicknesses of from 0.3 mm to 0.7 mm.

11. The battery according to claim 1, wherein for the external container having the sealing plate attached, a thickness of the external container $T_C$ (mm) in a direction parallel to the third direction and a height of the external container $H_C$ (mm) in a direction parallel to the first direction satisfy the following formula (7):

$$2.5 \leq H_C/T_C \leq 3.5 \qquad (7).$$

12. The battery according to claim 1, wherein for the external container having the sealing plate attached, a thickness of the external container $T_C$ (mm) in a direction parallel to the third direction and a width of the external container $W_C$ (mm) in a direction parallel to the second direction satisfy the following formula (8):

$$4.5 \leq W_C/T_C \leq 6.5 \qquad (8).$$

13. The battery according to claim 1, wherein the battery has a nominal capacity of 4 Ah or more.

14. A battery pack comprising the battery according to claim 1.

* * * * *